(12) United States Patent
Przada et al.

(10) Patent No.: US 11,995,130 B2
(45) Date of Patent: May 28, 2024

(54) SYSTEMS AND METHODS FOR DIGITIZATION SERVICES

(71) Applicant: BANK OF MONTREAL, Toronto (CA)

(72) Inventors: Zbigniew Przada, Toronto (CA); Jun Wang, Richmond Hill (CA); Ching Leong Wan, Toronto (CA)

(73) Assignee: BANK OF MONTREAL, Toronto (CA)

(*) Notice: Subject to any disclaimer, the term of this patent is extended or adjusted under 35 U.S.C. 154(b) by 468 days.

(21) Appl. No.: 16/517,364

(22) Filed: Jul. 19, 2019

(65) Prior Publication Data

US 2020/0026735 A1 Jan. 23, 2020

Related U.S. Application Data

(60) Provisional application No. 62/700,394, filed on Jul. 19, 2018.

(51) Int. Cl.
| | |
|---|---|
| *G06F 16/93* | (2019.01) |
| *G06Q 10/06* | (2023.01) |
| *G06Q 10/0631* | (2023.01) |
| *H04L 9/32* | (2006.01) |
| *H04L 29/08* | (2006.01) |
| *H04L 67/1097* | (2022.01) |

(52) U.S. Cl.
CPC ....... *G06F 16/93* (2019.01); *G06Q 10/06315* (2013.01); *H04L 9/3247* (2013.01); *H04L 67/1097* (2013.01)

(58) Field of Classification Search
CPC .............. G06F 16/93; G06Q 10/06315; H04L 67/1097; H04L 9/3247; H04L 67/02; H04L 63/104; H04L 63/126
See application file for complete search history.

(56) References Cited

U.S. PATENT DOCUMENTS

| | | | |
|---|---|---|---|
| 2014/0222578 A1* | 8/2014 | Poornachandran | G06Q 30/0241 705/14.61 |
| 2015/0110362 A1* | 4/2015 | Amtrup | G06V 30/40 382/112 |
| 2017/0123863 A1* | 5/2017 | Erickson | G06F 9/54 |
| 2018/0039921 A1* | 2/2018 | Mos | G06Q 10/103 |

(Continued)

*Primary Examiner* — Hosain T Alam
*Assistant Examiner* — Chongsuh Park
(74) *Attorney, Agent, or Firm* — FOLEY & LARDNER LLP

(57) ABSTRACT

Embodiments relate to systems and processes for digital document services, having at least a processor and a non-transient data memory storage, the data memory storage containing machine-readable instructions for execution by the processor, the machine-readable instructions configured to, when executed by the processor, provide a document service. The document service can extract data from a plurality of source systems; load and store the data at a data hub implemented by a non-transient data store; receive a request to generate a document package at the data hub, the request indicating a target unit; generate and store the document package using a subset of data from the data at the data hub, the document package having at least one electronic signature request; detect a signature event at the data hub; and transmit the document package to the target unit.

12 Claims, 37 Drawing Sheets

(56) References Cited

U.S. PATENT DOCUMENTS

| | | | |
|---|---|---|---|
| 2018/0204149 A1* | 7/2018 | Cortes Cornax | ......... G06F 8/34 |
| 2018/0204253 A1* | 7/2018 | Painter | ................. G06F 40/205 |
| 2018/0349778 A1* | 12/2018 | Pèrez Àlvarez | ...... G06F 16/245 |
| 2020/0002671 A1 | 1/2020 | Qu et al. | |

* cited by examiner

*TIBCO Nimbus permits process models to be compared in terms of relative cost, time savings, etc.

Hub Technology Stack

| | Current State | Target State |
|---|---|---|
| Process Documentation | Nimbus (TIBCO) | Nimbus (TIBCO) |
| Fax | RightFax (OpenText) | RightFax (OpenText) |
| Scan & Capture | Captiva (EMC), MFD (Lexmark) | Captiva (EMC), MFD (Lexmark) |
| Archive / Doc Mgmt | FileNet (IBM) | FileNet (IBM) |
| Workflow ("Move, Share") | AMX BPM (TIBCO) | AMX BPM (TIBCO) |
| e-Signature | — | DocuSign (DocuSign) |
| Search | FileNet (IBM) | (IBM)* |

*Search vendor/s to be selected (likely candidates are IBM, OpenText).

Sharepoint (internal) (Microsoft)

Sharepoint (internal) Sharepoint Online, OneDrive (Microsoft)

FIG. 28

SYSTEMS AND METHODS FOR DIGITIZATION SERVICES

CROSS REFERENCE TO RELATED APPLICATION

This application claims priority to U.S. Provisional Application No. 62/700,394 entitled SYSTEMS AND METHODS FOR DIGITIZATION SERVICES, the contents of which is hereby incorporated by reference. This application relates to U.S. application Ser. No. 16/517,253 entitled SYSTEMS AND METHODS FOR DATA STORAGE AND PROCESSING, the contents of which is hereby incorporated by reference.

FIELD

The present disclosure generally relates to the field of data storage systems and processing.

INTRODUCTION

A full-service financial service institution depends heavily on the use of technology to serve customers with a wide range of products and services. In addition, technology is used to meet stringent risk management and regulatory compliance.

An organization with a long history typically has adopted a myriad range of technologies from legacy platforms like mainframe to modern capabilities like mobile and analytic applications. An organization might have a large set of applications (many hundreds) through acquisition and integration.

To continue to deliver differentiating customer experience and transformation to keep pace or leap-frog competitors, both traditional and disruptive ones, an institution needs to be able to effectively and efficiently integrate the complex and diverse set of applications. An integrated enterprise not only forms the foundational capability to deliver any product and service across different channels, it also enables the ability to identify events and generates actionable insights to become an intelligent institution.

SUMMARY

Embodiments described herein relate to digitization and document management.

For example, this can involve capturing or scanning physical documents and performing recognition operations (to capture data form the document) for conversion into electronic documents to be properly cataloged and filed into the enterprise document repository for subsequent search and retrieval. In addition, documents associated with a specific business function (e.g., mortgage application may require multiple different documents) are automated tracked as a document package throughout its lifecycle, which is often integrated through a business process management (BPM) application that forms a repeatable and reusable business process pattern. This is an example business process pattern that can be used for Branch Scanning. Another example process pattern can be for Retail Branch service and product onboarding/account open process. The system can integrate the branch scanners which are informed by the document tracking services (built within a storage integration layer) to scan a document package determined by specific products/services onboarding BPM process. Such process has been reused for Wealth Management branch business. The processes can also be extended for business and commercial banking branch/office use case as well.

Systems for digitization and document management can connect with a digital library to access and update document data.

In an aspect, embodiments described herein provide a system for digital document services, comprising at least a processor and a non-transient data memory storage, the data memory storage containing machine-readable instructions for execution by the processor, the machine-readable instructions configured to, when executed by the processor, provide a document service configured to: load and store data from a plurality of source systems at a data hub implemented by a non-transient data store; define and store, at the data hub, process pattern for digitization of documents, the process pattern indicating document types; receive a request to generate a document package at the data hub, the request indicating a target unit, the request linked to the process pattern; generate and store, at the data hub, the document package using a subset of data from the data at the data hub and physical documents converted to electronic format according to the process pattern, the document package stored at the data hub for subsequent search and retrieval; and transmit the document package to the target unit.

In some embodiments, the document package is associated with a document package identifier, wherein the document services is configured to monitor the document package at the data hub, detect a document change notification, and store the change notification in association with the document package identifier as part of an audit log.

In some embodiments, the document services is configured to receive and store a modified version of the document package containing at least one electronic signature in response to at least one electronic signature request.

In some embodiments, the document services is configured to assign the document package to a user identifier having an access role, wherein prior to transmission, the document services is configured to check the access role and the target unit.

In some embodiments, the document package has at least one electronic signature request and wherein the processor can detect a signature event at the data hub and capture data from the signature event for storage as part of the document package.

In some embodiments, the document services comprises an electronic signature event listener to process the electronic signature event in real-time.

In some embodiments, the document services comprises an electronic signature event handler to receive the electronic signature events in real-time from the electronic signature event listener.

In some embodiments, the process pattern is linked to a business function, domain or application.

In some embodiments, the process pattern indicates a number of required documents for the document package.

In some embodiments, the process pattern indicates a type of required document for the document package.

In some embodiments, the processor integrates with one or more scanners to capture scanner data for the document package, the one or more scanners capturing the physical documents.

In accordance with an aspect, there is provided a system for digital document services, comprising at least a processor and a non-transient data memory storage, the data memory storage containing machine-readable instructions for execution by the processor, the machine-readable instructions configured to, when executed by the processor, provide a document service configured to: extract data from a plurality of source systems; load and store the data at a data hub implemented by a non-transient data store; receive a request to generate a document package at the data hub, the request indicating a target unit; generate and store the document package using a subset of data from the data at the data hub, the document package having at least one electronic signature request; detect a signature event at the data hub; and transmit the document package to the target unit.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 28 illustrates a schematic diagram of an example architecture of a digitization service platform according to some embodiments.

DETAILED DESCRIPTION

Figure 1A:
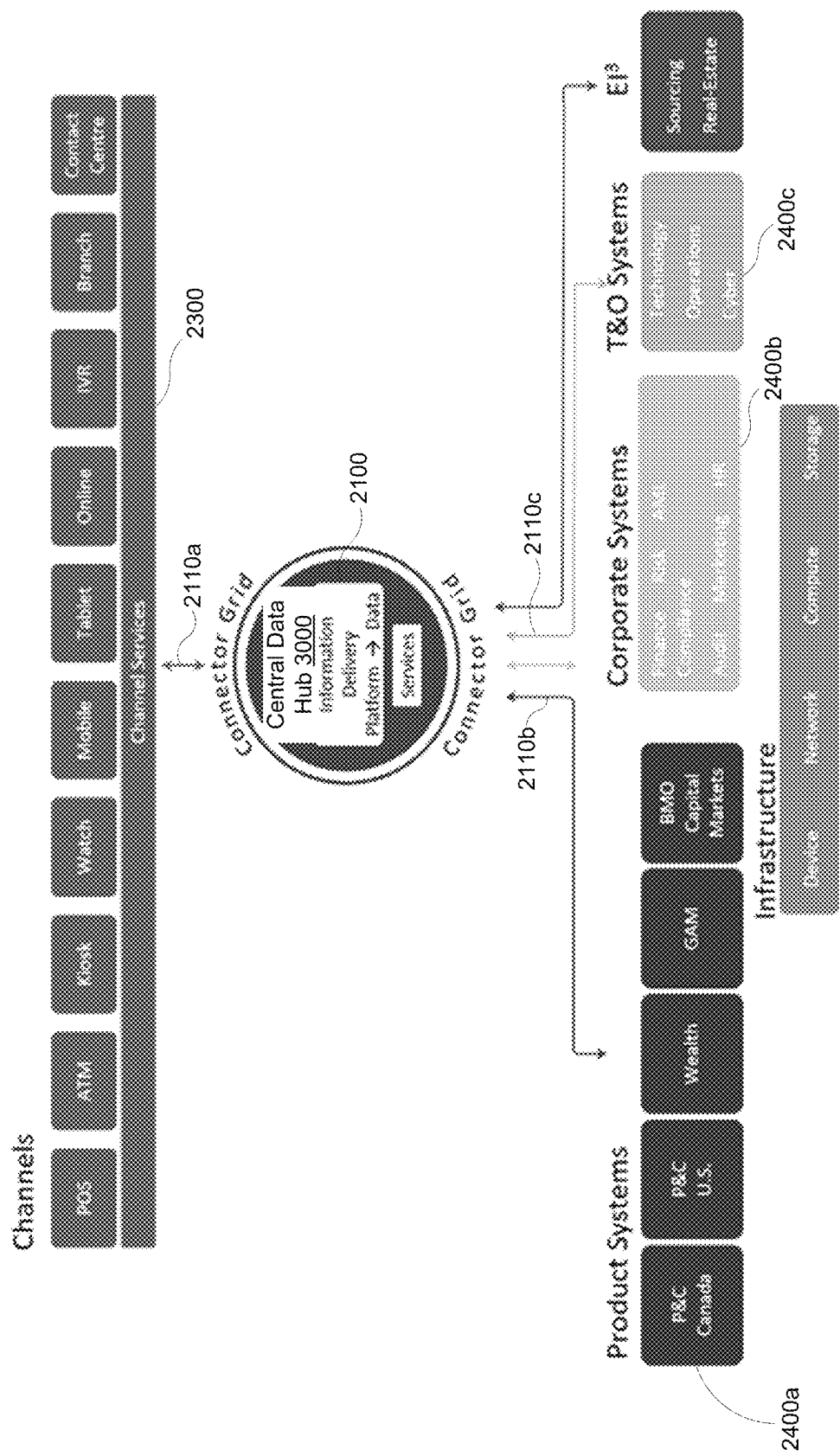
FIG. 1A illustrates a system architecture diagram of a proprietary Information Delivery Platform (IDP) in accordance with one embodiment.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Within an enterprise data warehouse, there may be large volumes of data being ingested and stored; computational demands may also be high for extracting, transforming or otherwise processing the volumes of data into end target databases or end appliances. With traditional ETL techniques, there exists a number of pain points: "data silos", which refer to data that is under control of one group or application and isolated from the rest of the organization may be common, and there may be need for replication of large volumes of data between the various appliances. In addition, computing and storage capacity are inherently coupled, and cannot be independently scaled. Data access control and security may be negatively affected.

The financial cost of data aggregation and consumption with current technology may be high, and meeting demand may become increasingly technically challenging.

Network bandwidth may also become a significant constraint for data communication between an enterprise data system and external systems, as well as in/out of the landing zone for batch data transmission for the enterprise data system.

In addition, capturing and maintaining accurate data lineage may also be challenging under the traditional approach.

There may be no "balance and control" or enterprise-level reconciliation patterns or models for data stored within a traditional enterprise data system. This may be the case if the enterprise data system serves as a book-of-reference and not a book-of-record. However, there is growing need for enterprise reconciliation/balance and control capabilities and patterns.

Improving ease of understanding of the data glossary and relationship between data/sources is needed to support self-serve data science initiatives.

The Financial Services Industry is a data driven industry. The scope, quality, cost, performance and freshness of data that has been "good enough" in the past is no longer good enough. Many critical bank processes require low cost, easy to access, reliable and consistent data. These process include but are not limited to: Anti Money Laundering Compliance, Regulatory and Compliance Reporting, Risk Management, Customer Insights, Sales Performance Management and Channel Optimization.

The Information Delivery Platform described in the embodiments herein incorporates new technology and a new operating model that optimizes the accountabilities for data quality and a simplified approach to information management. This platform may provide information management capability to meet the rapidly increasing demand for low cost, easy to access, reliable and consistent data.

Referring now to FIG. 1A, which illustrates a system architecture diagram of an example Information Delivery Platform (IDP) 2100 with Channels 2300, Product Systems 2400*a*, Corporate Systems 2400*b* and T&O (Technology and Operation) Systems 2400*c*.

In an example embodiment, IDP 2100 is a data aggregation, processing, and analytics environment, combining multiple sources of data into a single organization-wide repository, and providing fast and cost-effective access to data.

In the present application, as an example, the organization is a bank. However, it should be appreciated that the organization can be any type of organization or company that requires storage and processing of data for daily operations. For example, the organization can be a government entity, a law firm, a school, a store, or a restaurant, and so on.

IDP 2100 provides more data in less time. It provides users with a high performance platform for processing queries. It has built in data quality management, high availability and disaster recovery. Its innovative operating model provides subscriber businesses a direct CIO accountability to ensure their specific needs are met. It may provide the opportunity to eliminate data sprawl by eliminating the motivations to create redundant and overlapping data marts. It may provide the following benefits: CIO accountability model means conversations about sourcing data, its content and it's quality take place directly between the owners of the source systems and the consumers of the data; high performance, cost efficient staging platform means improved query performance and lower costs for accumulating low level detail data; data quality management means problems in the source data are identified early and actively managed; consumer driven data model means the integrated database structures are presented in simple, business friendly terminology; and provides for self-serve data usage.

IDP 2100 is a shared information management component of the Analytical/Data Hub that will provision well managed data to meet multiple reporting and analytical requirements quickly and efficiently. Its innovative operating model leverages the strengths of all stakeholders and eliminates unnecessary hand offs. It is built from the ground up to meet the requirements of regulators and business process that demand on-going demonstration of data quality management and proof that the data is an accurate and complete representation of reality. It presents data to the business community using industry and bank terminology. It will provide the opportunity to eliminate data sprawl by eliminating the motivations to create redundant and overlapping data. It may provide robust, highly resilient infrastructure, DR (Disaster Recovery), high performance as most queries and loads run in a fraction of the time of existing platforms, easy tracking of data assets under management, data stewardship and data governance, data quality management and reporting capability, and data in cross application integrated (L2) model.

In an example embodiment, central data hub 3000 includes IDP 2100. In one embodiment, the IDP 2100 may include a scalable data store (also referred to as a "data lake"), which may collect and store massive amounts of data for long periods of time. The data stored may be structured, semi-structured, unstructured, or time-sensitive data (e.g. events, etc.). A central aggregation and distribution point ("book of reference") may be generated for all book-of-record data within the bank, which provides consistent and efficient access to reference data. Both raw and processed data within the data lake may be available for consumption; powering analytics; machine learning; consumer-specific data accessible via batch, SQL, streaming, native Hadoop APIs. Linear scalability of data is also provided.

In some embodiments, IDP 2100 is connected to channel services 2300 through connector grid 2110*a* and connected to product systems 2400*a*, corporate systems 2400*b* and T&O systems 2400*c* through connector grids 2110*b* and 2110*c*.

Channel services 2300 may include internal or external interfaces adapted for different service groups, such as Point-of-Sale (POS) terminals, watch interfaces, mobile devices, tablet devices, online portals, ATMs, branches, call centers, sales forces, and so on. Each of these service group may receive and utilize data from IDP 2100 through connector grid 2110*a*. Each channel may have a user interface designed to display various data and information and to receive user inputs.

Across channels 2300, customer information can be captured consistently at all points of collection for all LOBs and channels, aligned to standards defined for the Enterprise Customer Domain. A single view of customer information and aggregate view of customer holdings can be displayed on channels, in real-time or near real-time, and on demand if necessary.

In addition, product systems 2400*a*, corporate systems 2400*b* and T&O systems 2400*c* may also receive and utilize data from IDP 2100 through connector grids 2110*b*, 2110*c*.

IDP 2100 may receive raw data from a variety of data sources. Data sources include, among others:
- Book of record transaction systems (BORTS)
- Clickstreams (web-logs)
- Social media
- Server/machine logs
- Unstructured data
- Real-time event streams Raw data may be received and stored into a staging area. The staging area may be part of a "data lake" foundation from which groups across the organization can draw needed data. This staging area may be also referred to as "level 0 (L0)" data storage.

For example, when the organization is a bank, different groups may utilize data from the data lake. The groups may include: AML (Anti-Money Laundering), BOBS 239, Conditional Offer Pricing, Volcker, CCAR, FATCA, IFRS9, Stress Testing Model Development, Reg-W, Procure-to-Pay, Enterprise Customer Information (ECIF), Leads, Leads, TF, LRM/SMR, U.S. Heightened Standards, Enterprise Wire Payments, LOB (Line of Business) Scorecards, Corporate Audit Analytics, Fraud/Criminal Risk Investigation, Legacy Data Marts Simplification.

IDP 2100 may be the foundation for the overarching data environment, combining multiple sources or book of record transaction systems (BORTS) into a single organization-wide repository and provides fast and cost-effective access to both raw and conformed data.

Figure 1B:
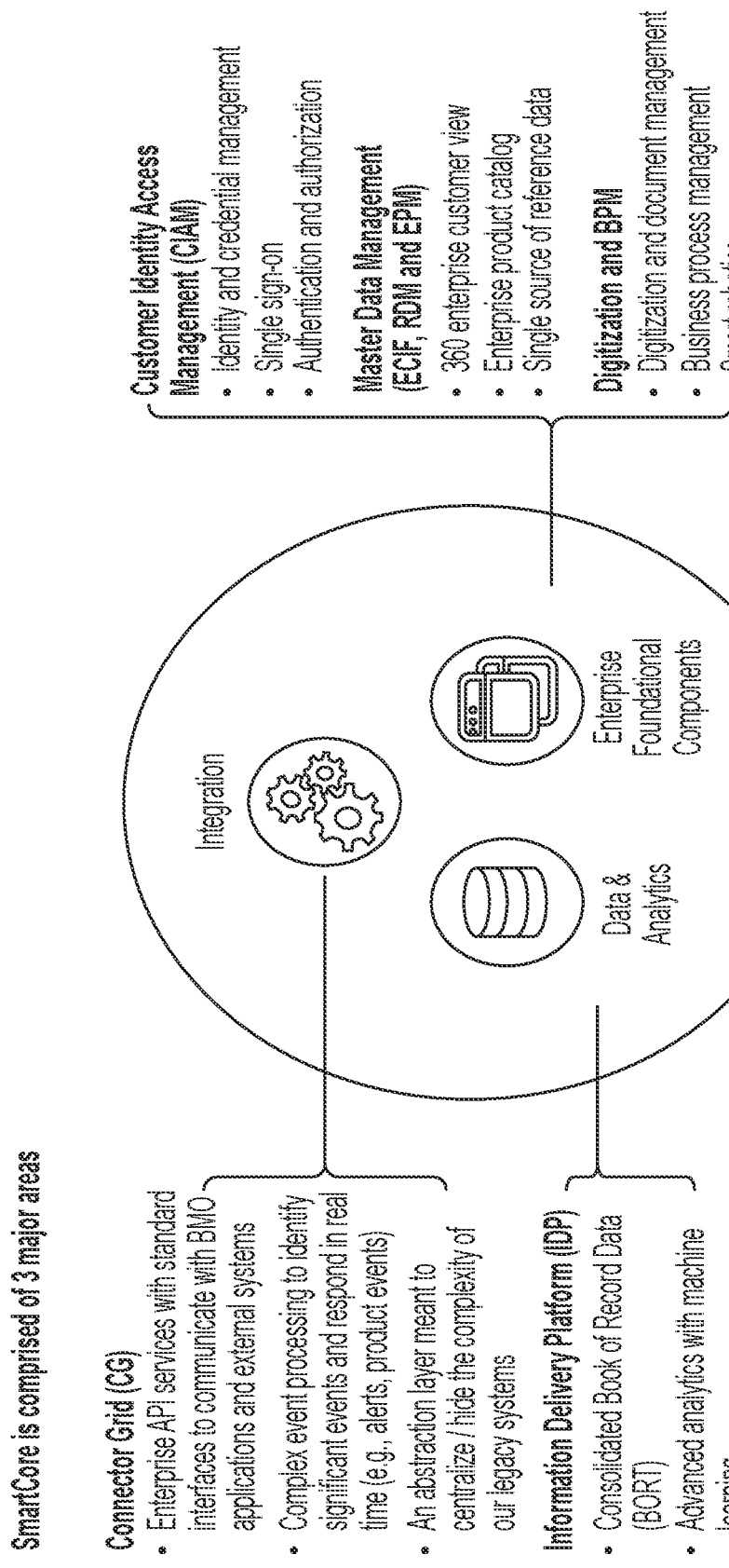
FIG. 1B is a view of components of a data storage and processing system including IDP.

FIG. 1B is a view of components of a data storage and processing system. The system includes an integration component, data and analytics component, and enterprise foundational components. The integration component has a connector grid. The connector grid provides enterprise API services with standard interfaces to communicate with applications and external systems. The data and analytics component has a consolidated Book of Record Data (BORT) and advanced analytics with machine learning.

The enterprise foundational components include CIAM for identity and credential management. CIAM enables single-sign on for data access with authentication and authorization. The enterprise foundational components include Master Data Management components ECIF, RDM, and EPM to provide a 360 degrees, holistic customer view of data. The Master Data Management components have an enterprise product catalog. The Master Data Management components provide a single source of reference data. The enterprise foundational components include digitization and business process management for digitization and document management with smart robotics.

IDP 2100 integrates with digital document services to define and store, at the data hub, process pattern for digitization of documents. The process patterns are re-usable. The process pattern indicate document requirements. Example requirements relate to document type or a number of documents. The digital service receives a request to generate a document package at the data hub, and the request can be linked to the process pattern. The linked process pattern defines parameters or operations and requirements for the document package. The process pattern can be liked to a business function. For example, the process pattern can indicate requirements for documents associated with a specific business function (e.g., mortgage application may require 5 different documents) so that the digitization process can be automated and a set of documents tracked as a package throughout its lifecycle, which can be integrated through a business process management (BPM) application to provide a repeatable and reusable business process pattern. The service can generate and store, at the data hub, the document package using a subset of data from the data at the data hub and physical documents converted to electronic format according to the process pattern. The document package can stored at the data hub for subsequent search and retrieval; and transmit the document package to the target unit. In some embodiments, the process pattern is linked to a business function, domain or application. In some embodiments, the process pattern indicates a number of required documents for the document package. In some embodiments, the process pattern indicates a type of required document for the document package.

The document package can be associated with a document package identifier. The document services can be configured to monitor the document package at the data hub, detect a document change notification, and store the change notification in association with the document package identifier as part of an audit log.

In some embodiments, the document services is configured to receive and store a modified version of the document package containing at least one electronic signature in response to at least one electronic signature request.

In some embodiments, the document services is configured to assign the document package to a user identifier having an access role, wherein prior to transmission, the document services is configured to check the access role and the target unit.

In some embodiments, the document package has at least one electronic signature request. The service can detect a signature event at the data hub and capture data from the signature event for storage as part of the document package.

In some embodiments, the document services comprises an electronic signature event listener to process the electronic signature event in real-time.

In some embodiments, the document services comprises an electronic signature event handler to receive the electronic signature events in real-time from the electronic signature event listener.

In some embodiments, the processor integrates with one or more scanners to capture scanner data for the document package, the one or more scanners capturing the physical documents. The scanner data can provide metadata about the capture and also quality data.

Figure 2:
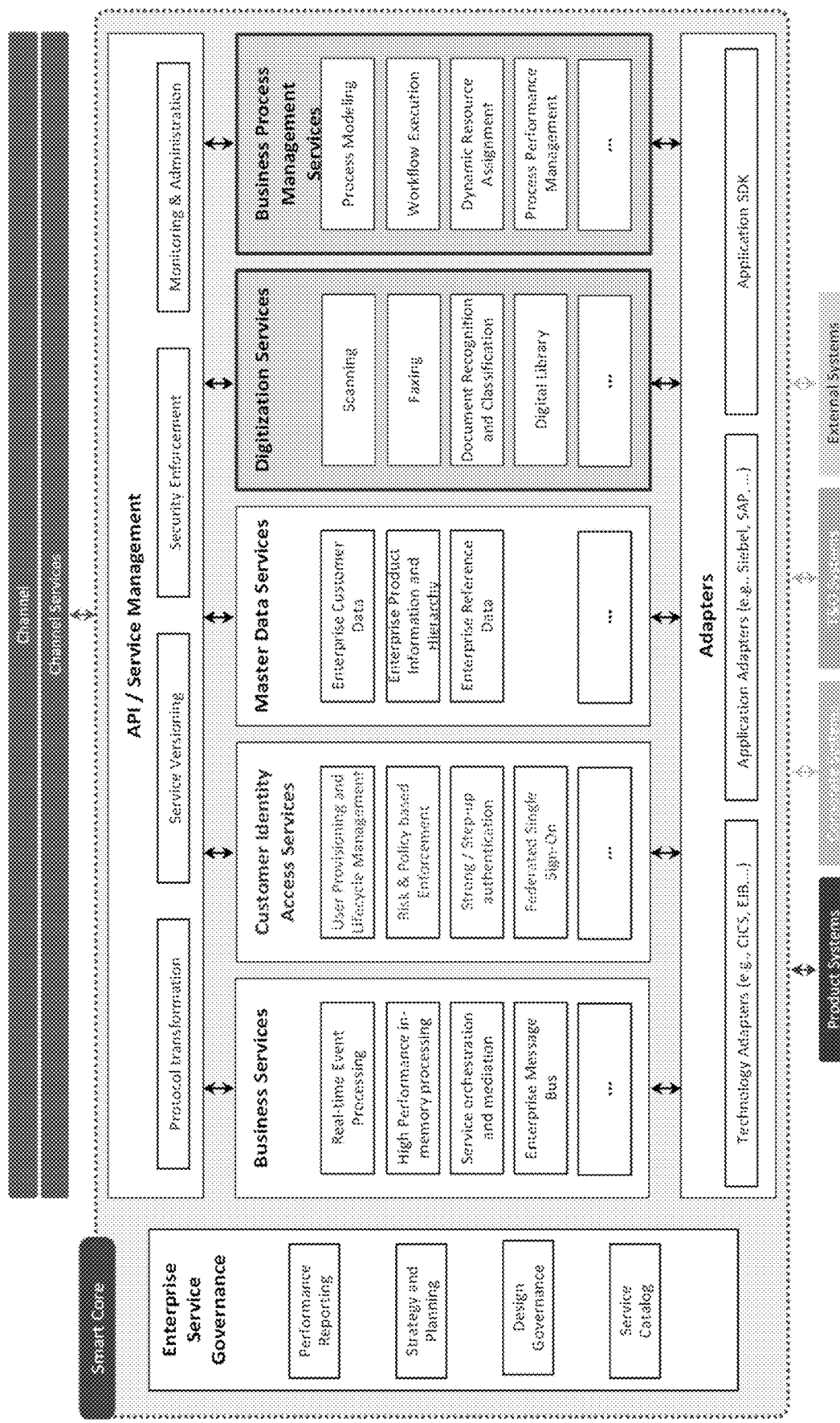
FIG. 2 illustrates a schematic diagram of a digitization service platform as part of the IDP of FIG. 2 according to some embodiments.

FIG. 2 is a schematic diagram of an example architecture for a digitization and BPM services platform of IDP 2100 according to some embodiments. As depicted, the platform includes an enterprise service governance unit and an API/service management unit, which connects to each of a business services unit, customer identity access services unit, master data services unit, digitization services unit, and business process management services unit, each of which connects to an adapter unit. The platform in turn connects to one or more of the following: product systems, corporate systems, technology and operations systems, and external systems. Each of these units can include the respective units as depicted.

The BPM services include process patterns to define re-usable process for generating document packages. The process patterns can indicate requirements for documents. Digitization can involve capturing or scanning physical documents and performing recognition operations (to capture data form the document) for conversion into electronic documents to be properly cataloged and filed into the enterprise document repository for subsequent search and retrieval. In addition, documents associated with a specific business function (e.g., mortgage application may require multiple different documents) are automated tracked as a document package throughout its lifecycle, which is often integrated through a business process management (BPM) application that forms a repeatable and reusable business process pattern. This is an example business process pattern that can be used for Branch Scanning. Another example process pattern can be for Retail Branch service and product onboarding/account open process. The system can integrate the branch scanners which are informed by the document tracking services (built within a storage integration layer) to scan a document package determined by specific products/services onboarding BPM process. Such process has been reused for Wealth Management branch business. The processes can also be extended for business and commercial banking branch/office use case as well.

Figure 3A:
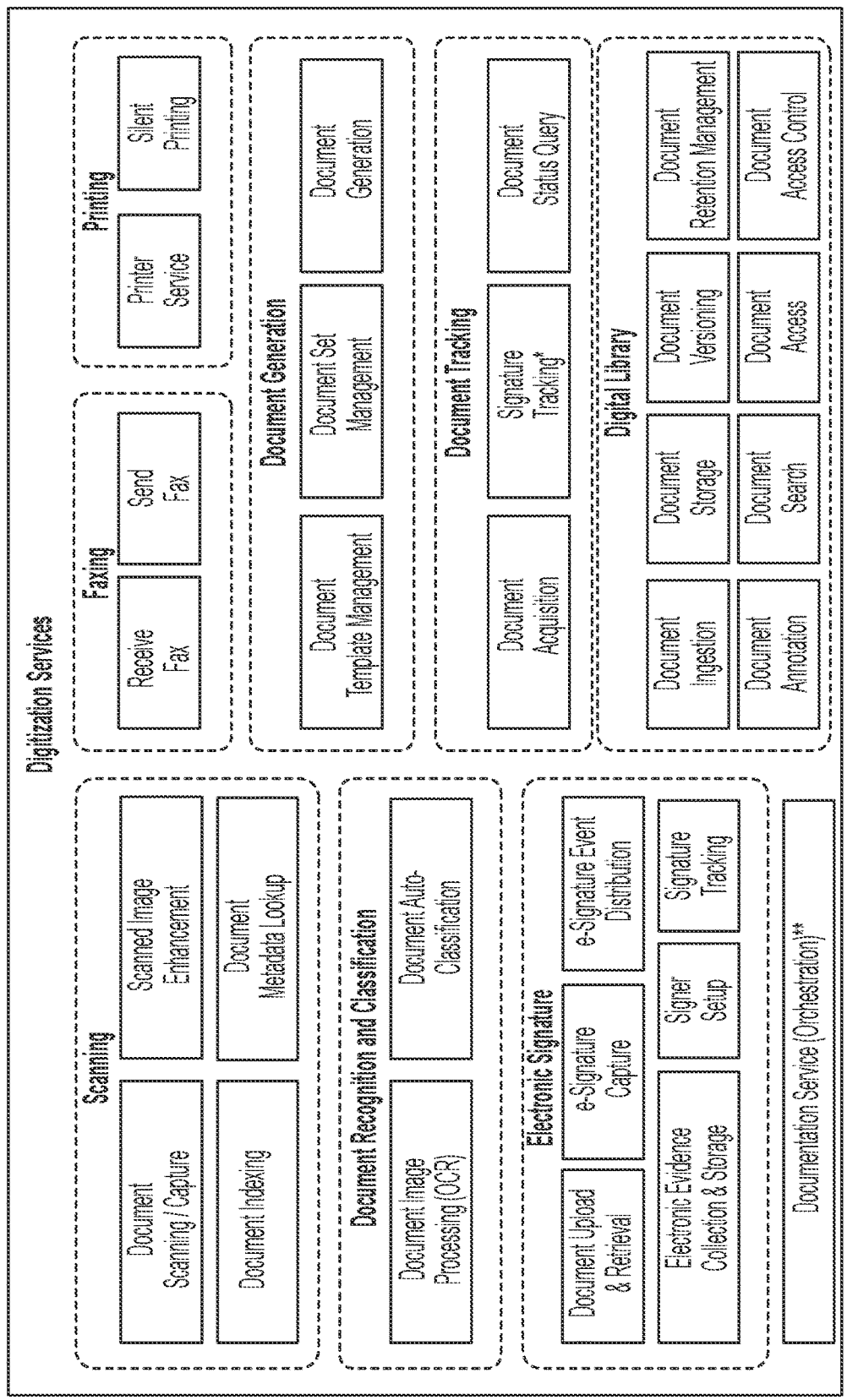
FIGS. 3A and 3B illustrate a schematic diagram of a digitization service platform according to some embodiments.
Figure 3B:
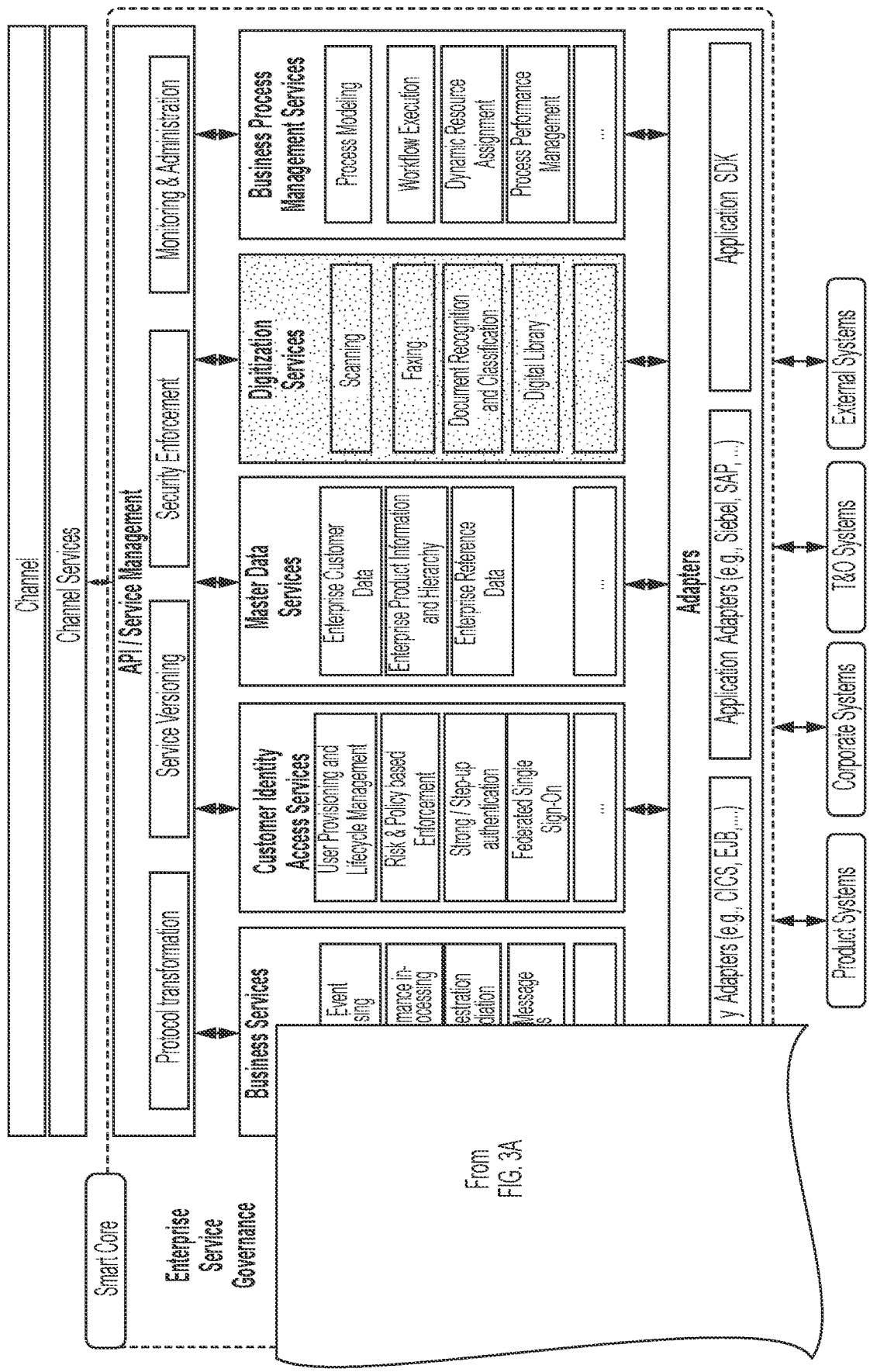

FIGS. 3A and 3B illustrate a schematic diagram of an example architecture for digitization capabilities according to some embodiments. As depicted, digitization services can include scanning units, document recognition and classification units, electronic signature units, faxing units, printing units, document generation units, document tracking units, digital library units, and documentation service (orchestration) units. The Document Tracking service enables signature-tracking in conjunction with document-acquisition tracking, and provides a single, accessible, point of reference for all document tracking capabilities through a Connector Grid service (Document Tracking Service). Document "Orchestration" refers to automated sequences of capabilities such as document generation, storage, electronic signing, etc.

As an example, in some embodiments, a digitization services platform implements an improved document scanning system, for example, usable at bank branches. The digitization services platform automatically creates document packages and tracks them including eSigning. As with other services implemented by digitization services platform, this may provide an audit trail that is as authentic, validated, and verifiable as a paper-based workflow. For example, the digitization services platform generates a form (e.g., paper or electronic) or request for initiation of a particular workflow. This may be a form that is to be physically signed by a user. The digitization services platform is then configured to scan and receive the signed form or other indicia (e.g., electronic selection) that can be used by the platform to identify a particular workflow. The digitization services platform is then configured to initiate a particular workflow, for example, by OCR of the text or contents of the signed form or the received indicia. For example, the indicia can be data indicating a mortgage application workflow is requested. The digitization services platform includes an application that generates a tracking service to track and determine the number and type of documents needed for a particular workflow. The digitization services platform may then generate the appropriate data, for example, number and type of documents needed for that workflow and can provide same to the user. The digitization services platform is configured to wait for receipt of completed or scanned versions of the completed documents and is configured to identify and wait for receipt of each and all of the documents determined to be required according to the workflow selected (e.g., mortgage application). For example, the digitization services platform may be configured to wait for seven documents of a particular type to be scanned and received before moving to the next stage of the workflow. In this example, the next stage of the workflow may be the authorization of a mortgage.

In some embodiments, each stage is performed electronically, for example, on an iPad. This can include the indication of the workflow requested, signing of documents, and providing completed documents to the digitization services platform. In each scenario in some embodiments, the digitization services platform is configured to track all the documents needed for the workflow. In some embodiments, the digitization services platform is configured to interoperate with external services such as those providing eSignature capabilities and signing ceremony functionalities. In these situations, the digitization services platform is configured to pass control to the external application for same to complete the signing ceremony and receive control back from the external application once the signing ceremony has completed.

In some embodiments, the digitization services platform includes an OCR index that can be used to tag documents with appropriate data attributes so as to be able to associate the document with particular data, for example, with identifiers of a particular mortgage application or customer. Various document types may be accepted by the digitization services platform. This provides enhanced end to end digitization service capabilities. In this way, digitization services platform is configured to track all documents received and associate same with the correct context, for example, for later retrieval. This can improve or optimize document retrieval time and allow for enhanced organization and access of documents relating to even other categorizations apart from the specific context the documents were received in. These attributes can also provide a feature set or a basis for extraction of a feature set for machine learning. Digitization services platform is configured to interconnect with a machine learning unit, for example, included as another component of the IDP that is configured to process, organize, or facilitate understanding of the data.

In some embodiments, digitization services platform is configured to provide service across an enterprise, including for different contextual environments and technical requirements associated with various lines of business, computer systems, services, channels, applications, and appliances within the enterprise. This may reduce or eliminate what would otherwise be a need for duplication of data and digitization service implementation. All channels, applications, and respective use cases may reuse these defined capabilities (e.g., form generation, rendering of a representation of a document to solicit data input from a user, etc.) of digitization services platform. For example, a particular use case (e.g., mortgage application request) for a particular channel or application may engage with a selection of these defined capabilities, with each other use cases engaging with different or the same set of defined capabilities. This may also allow for improved maintenance and update processes of any component of the digitization services platform, as same can be updated once, with the updated features of the digitization services platform provided to all applications and systems across the enterprise. In some embodiments, these changes are propagated to all or a selection of relevant channels, services, systems, and use cases.

In some embodiments, digitization services platform is configured to eliminate the need for scanning, with all documents provided, completed, signed, authenticated (e.g., identification of the user without scanning official identity documents) and received electronically, and, in some embodiments, partially or wholly in the background. Further, in some embodiments, digitization services platform is configured to improve form generation to support different configurations and use cases. An example form may be provided to a user to receive data that is used to initiate the rendering of documents flexibly to receive further input.

In some embodiments, digitization services platform is configured to generate and print a hard copy of documents, for example, copies of an agreement, at the end of the appropriate workflow.

In some embodiments, digitization services platform is integrated with risk management platforms.

Figure 4A:
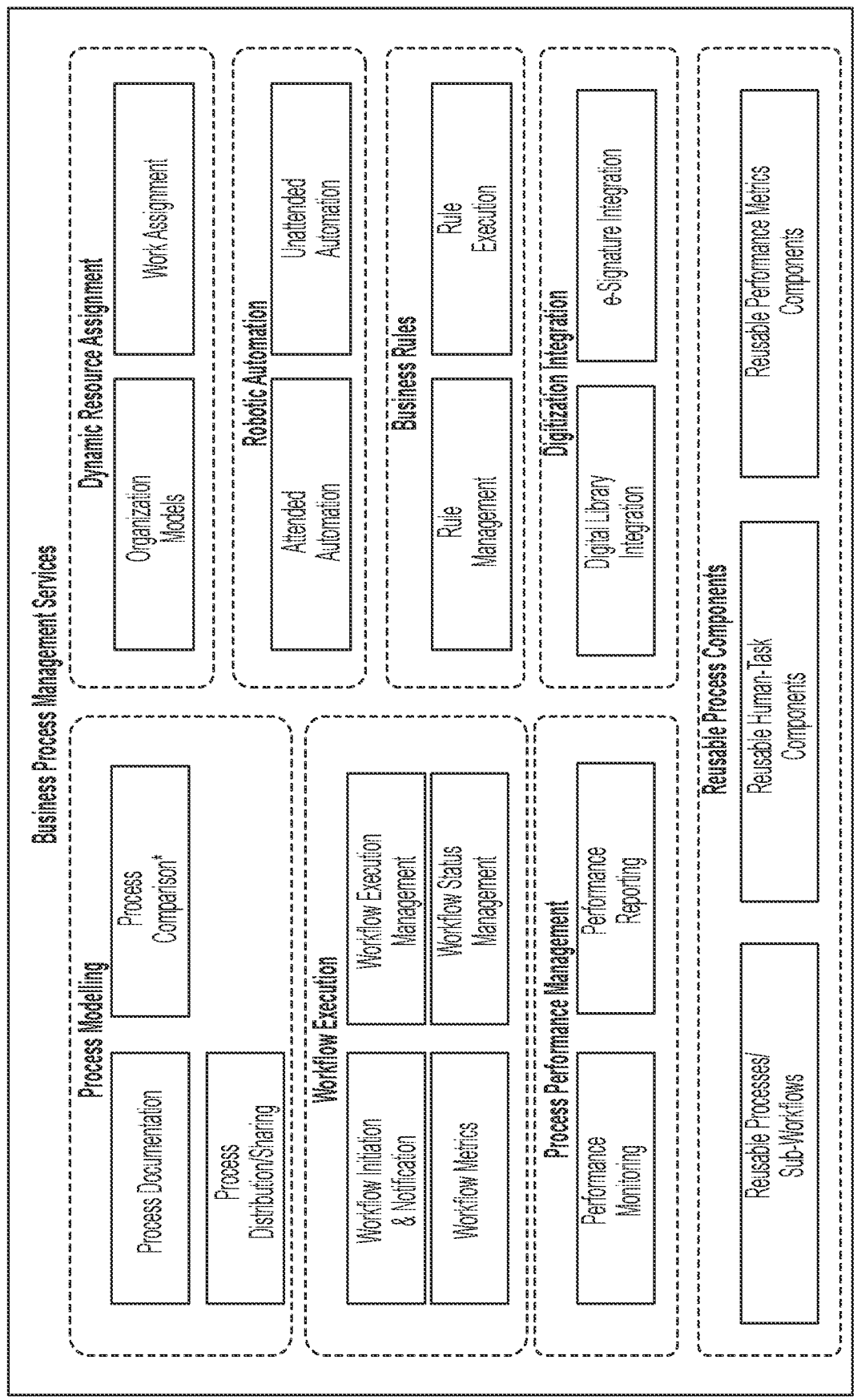
FIGS. 4A and 4B illustrate a schematic diagram of a digitization service platform according to some embodiments.
Figure 4B:
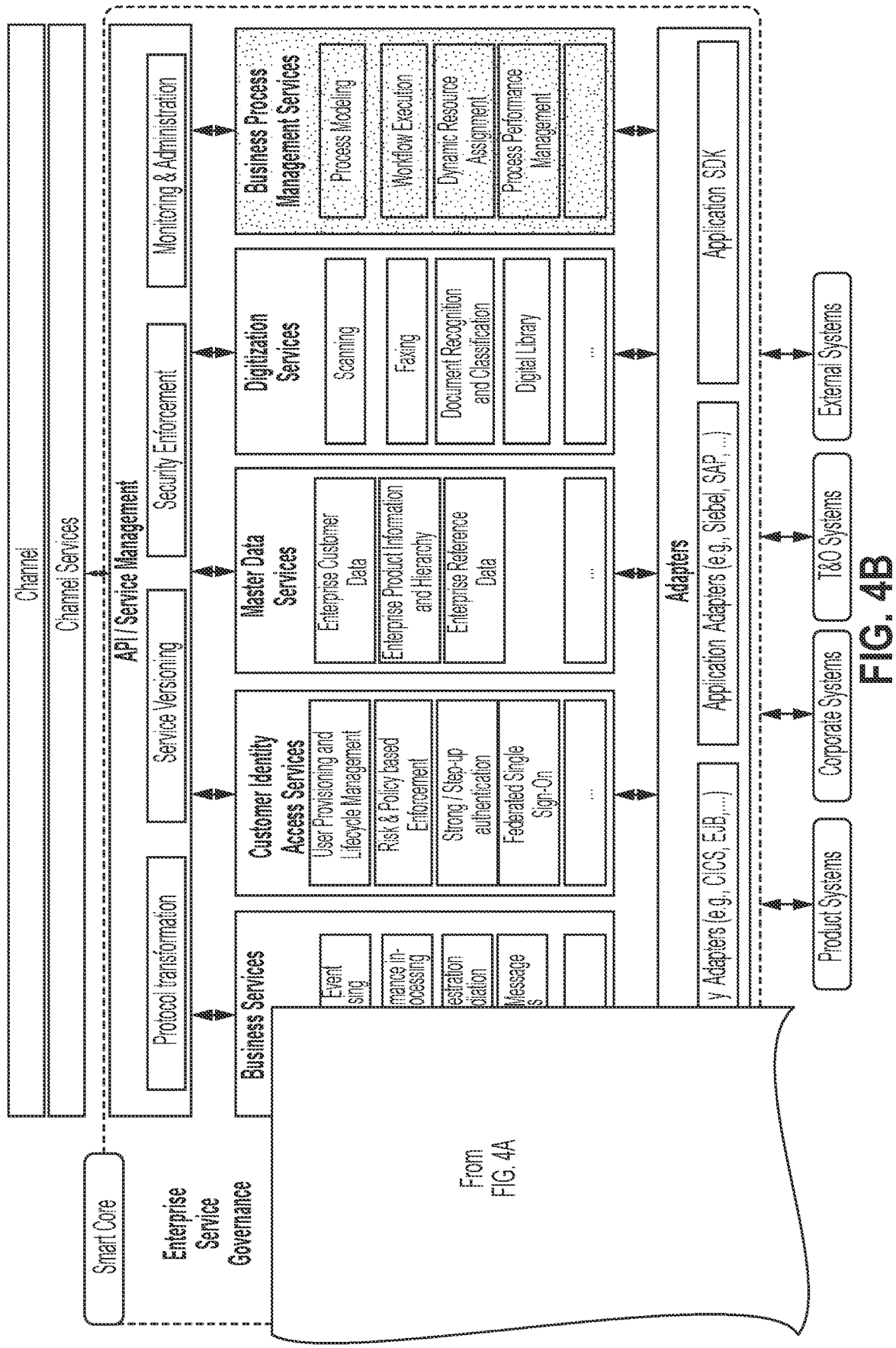

FIGS. 4A and 4B depict example business process management capabilities according to some embodiments. As depicted, the platform can include a business process management services unit, which can include a process modelling unit, workflow execution unit, process performance management unit, reusable process component units, dynamic resource assignment unit, robotic automation unit, business rules unit, and digitization integration unit, with sub-units as depicted.

Digitization services can include document generation, capture, storage, and e-signature.

Figure 5A:
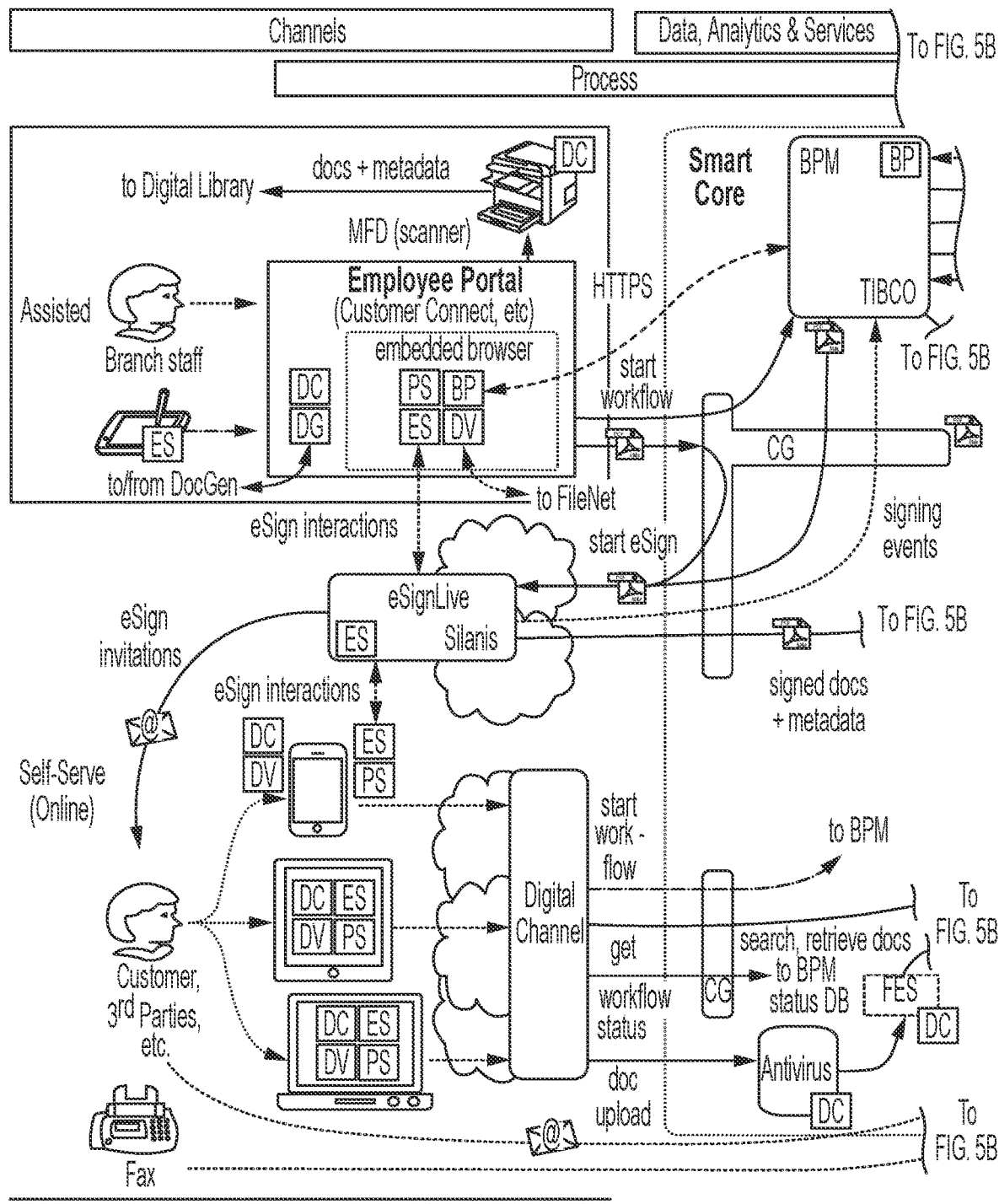
FIGS. 5A-5C illustrate a schematic diagram of a digitization service platform according to some embodiments.
Figure 5B:
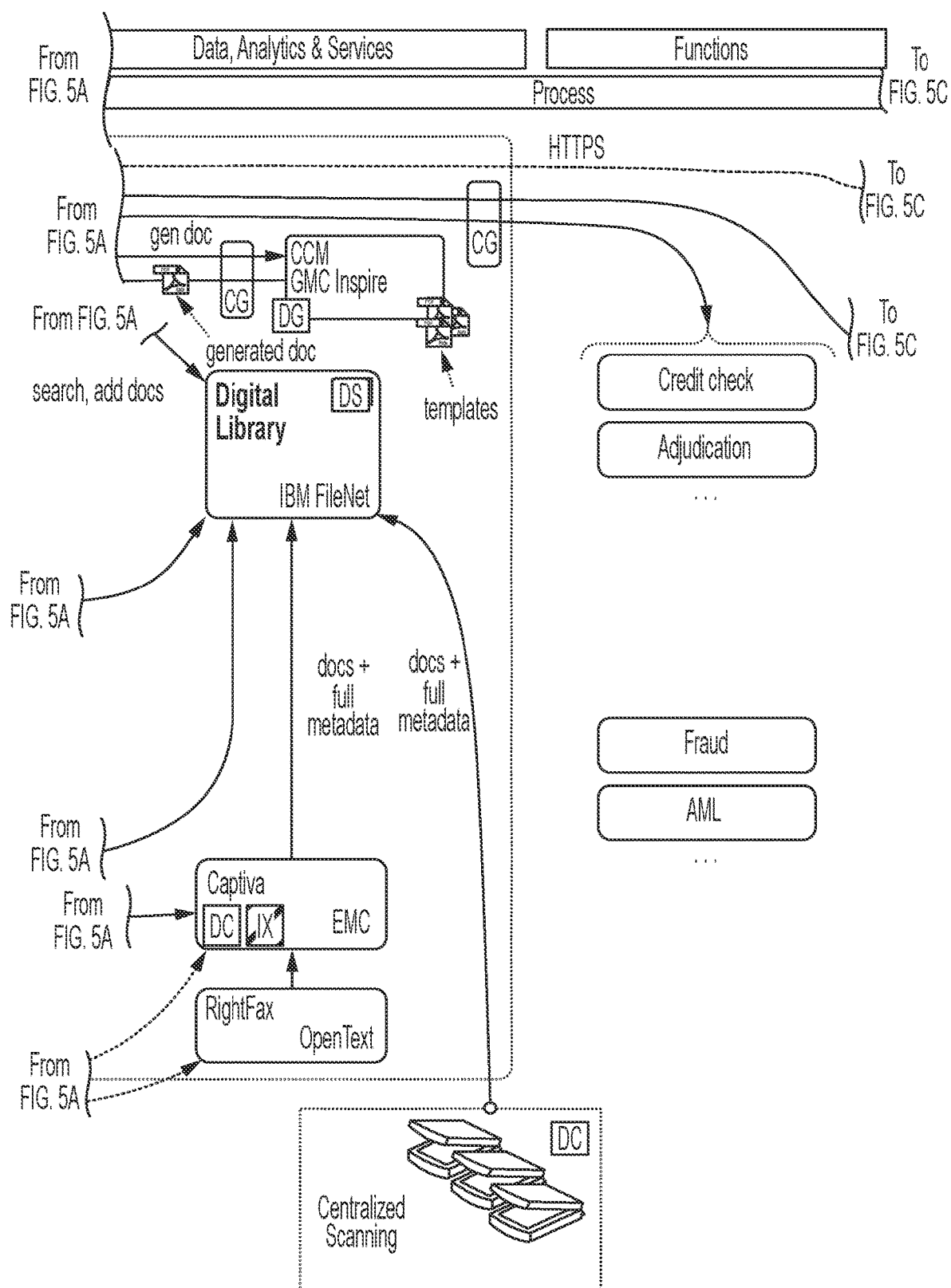
Figure 5C:
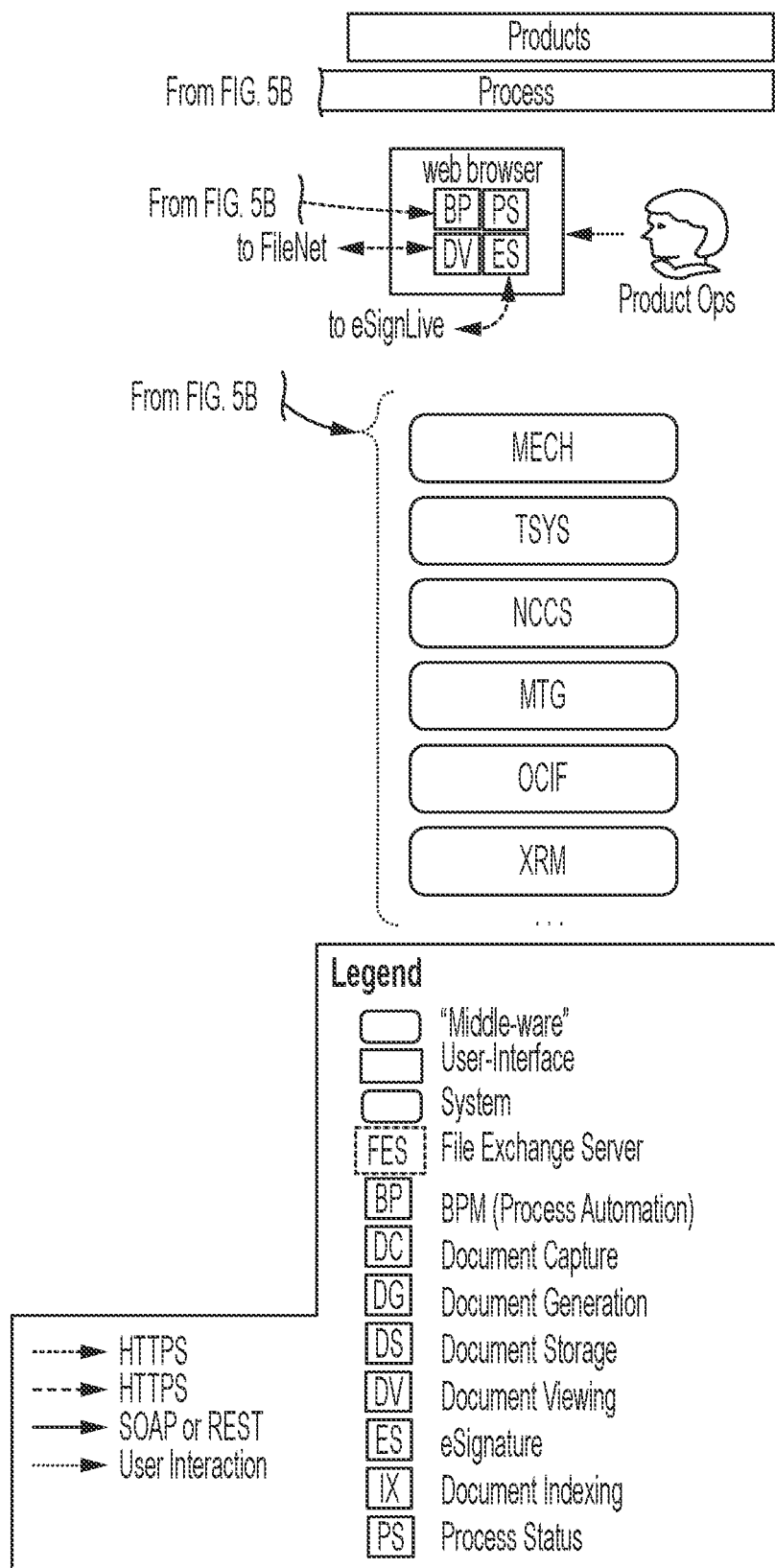

FIGS. 5A-5C depict an example architecture for Digitization and BPM, according to some embodiments. FIGS. 5A-5C are intended to provide an example context for the overall Digitization components. As depicted, a digitization process can flow through a number of various units within stages such as channels; data, analytics, and services; functions; and products. The digitization process can include self-service (online), as well as assisted (e.g., by bank branch employees) processes. Each step is performed by units providing process automation, document capture, document generation, document storage, document viewing, eSignature capabilities, document indexing, and process status, as depicted. Customers can capture and upload documents, eSign documents, view documents stored with the organization, trigger process flows as a result of online applications, and see process flow statuses, for example. Third parties can capture and upload documents, eSign documents, and view documents stored with the organization, for example. Faxed documents are indexed and stored in digital format in the digital library.

Figure 6:
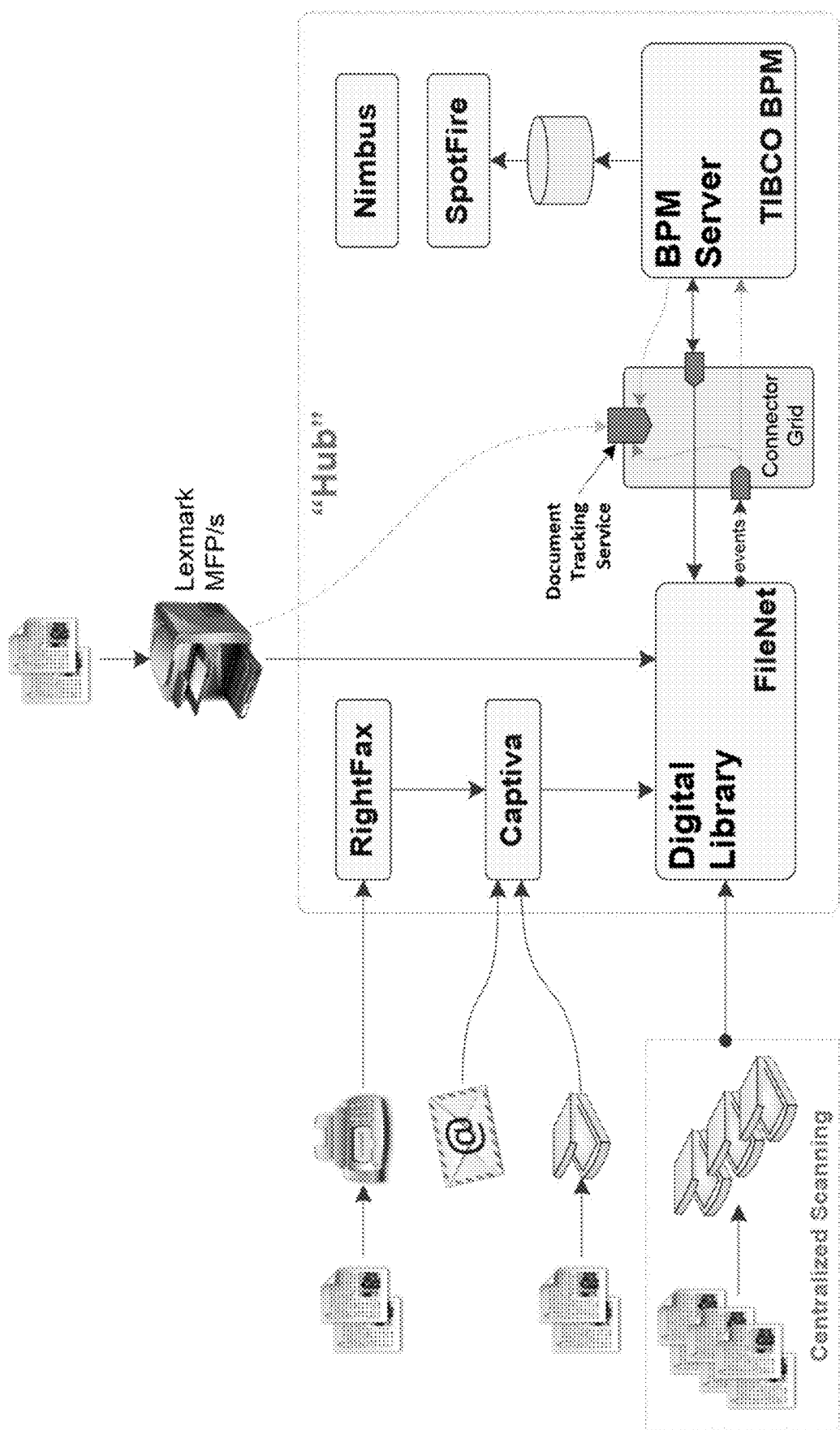
FIG. 6 illustrates a schematic diagram of a digitization service platform according to some embodiments.

FIG. 6 depicts an example schematic diagram of Document Management implemented by a digitization services platform, according to some embodiments. As depicted, a Hub can receive data, for example, from a centralized scanning unit, which can be provided to a digital library unit. The Hub can include one or more RightFax units, Captiva units, Connector Grids (including document tracking service), BPM servers, databases, SpotFire units, and Nimbus units, each interconnected as depicted.

Figure 7:
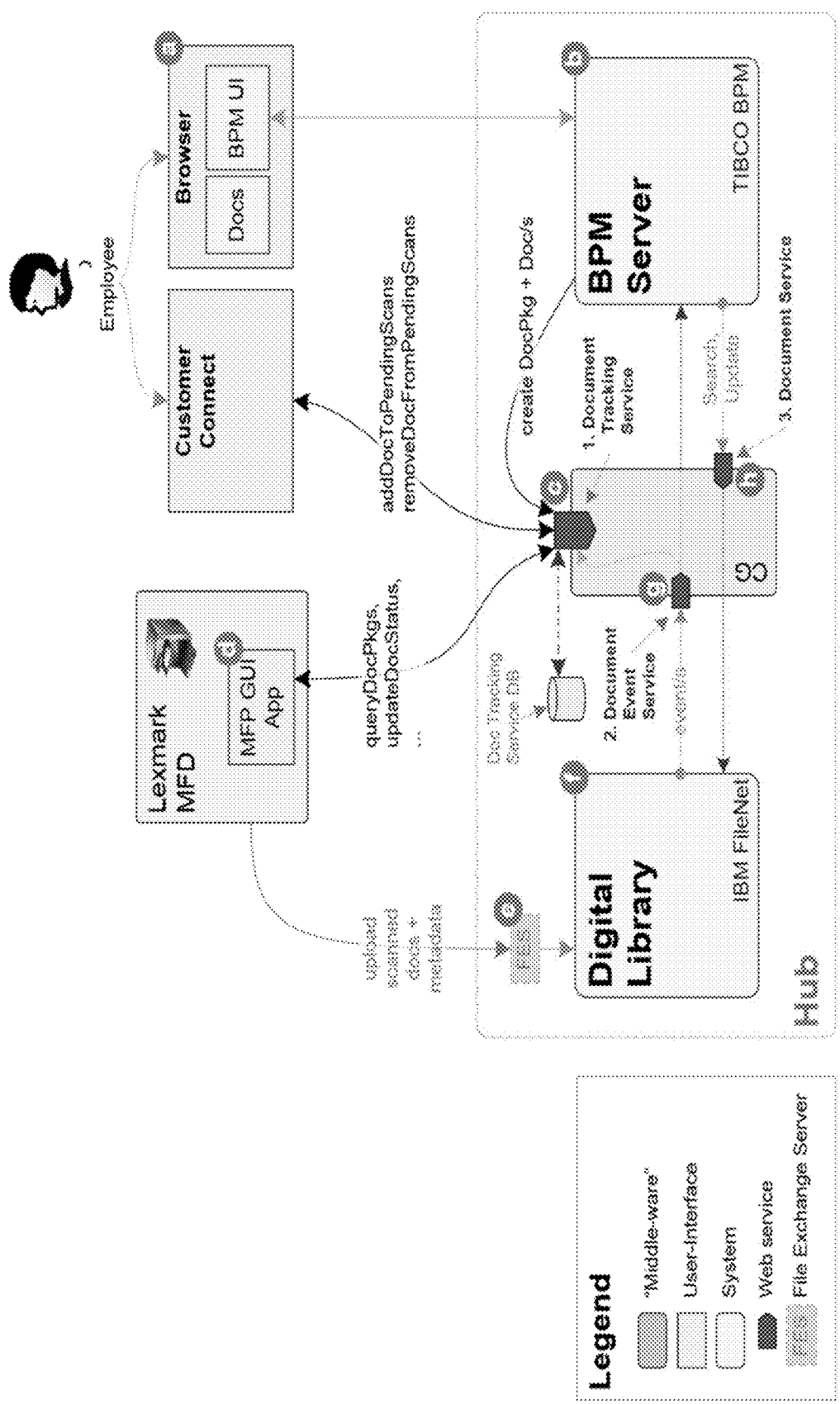
FIG. 7 illustrates a schematic diagram of a digitization service platform according to some embodiments.

FIG. 7 is a schematic diagram of an example logical architecture for a distributed scanning service of a digitization services platform, according to some embodiments. As depicted, a Hub can include a digital library unit, middle-ware unit, and a BPM server. The middle-ware unit can include a document tracking service, document event service, and document service, as well as provide communication between the digital library unit and BPM server, as depicted. An employee of the organization can engage with a customer connect unit as well as a browser. An MFD unit, for example, can upload scanned documents and metadata to the digital library unit, via File Exchange Server. Data can flow through the depicted units sequentially according to the sequence indicated by the reference letters.

Figure 8:
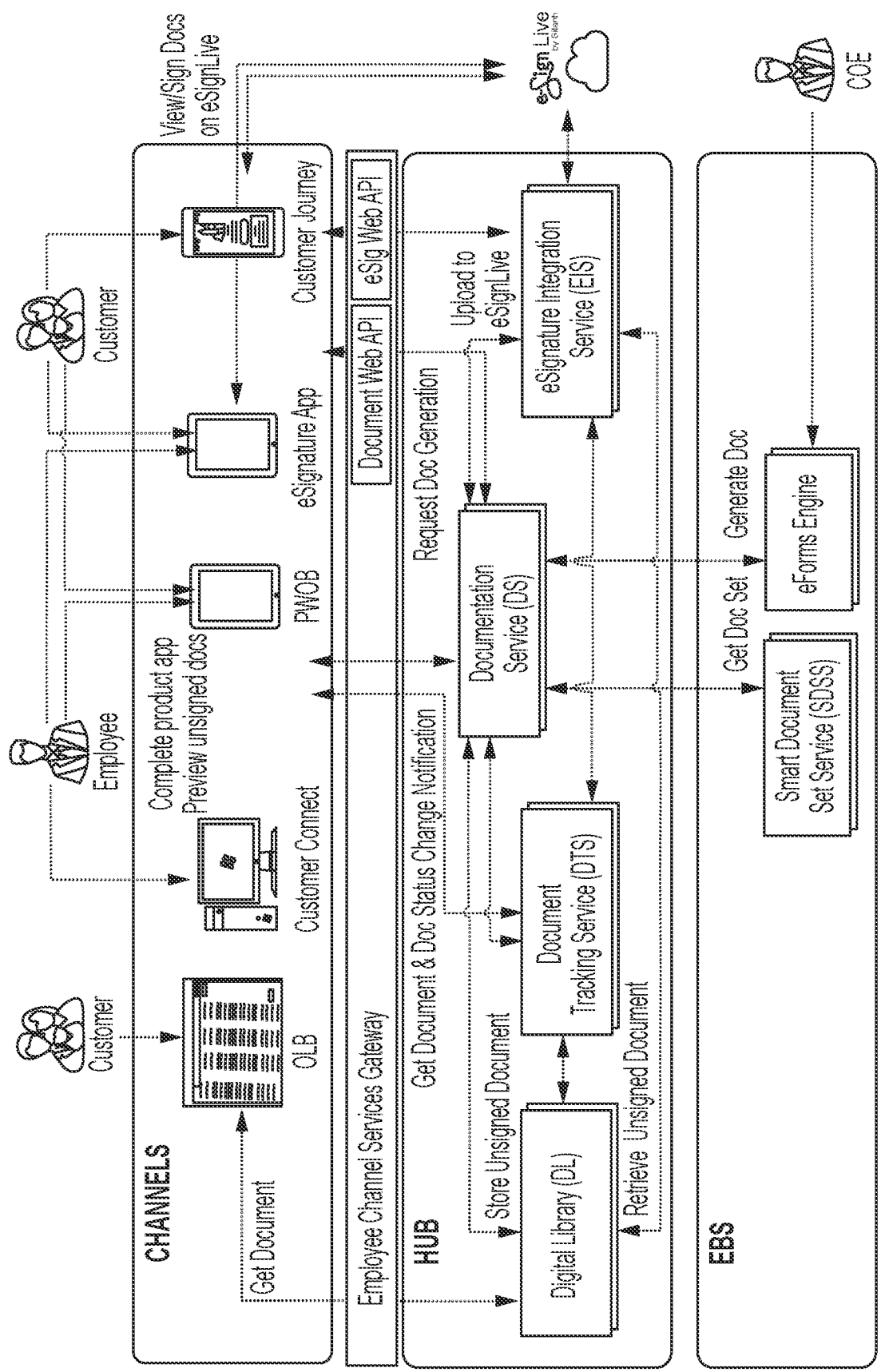
FIG. 8 illustrates a schematic diagram of a digitization service platform according to some embodiments.

FIG. 8 is a schematic diagram of an example logical architecture for a document generation, e-Signature service of a digitization services platform, according to some embodiments. As depicted, a user can view or sign documents or provided data to a signature unit. The user and/or employee can engage with an eSignature App via a computing unit, a private wealth onboarding unit, customer connect unit, and online banking unit. Each of these units can operate within one or more channel units that interconnect with a Hub, for example, through an employee channel services gateway. The Hub can interconnect with an enterprise banking system unit. The Hub can include a digital library (DL) unit, document tracking service (DTS) unit, document service (DS) unit, and eSignature integration service (EIS) unit. The EBS unit can include a smart document set service (SDSS) unit and an eForms engine. Each of these units can interconnect with other units as depicted. For example, the DL unit can store unsigned documents from the DS unit. The DL unit can retrieve unsigned documents from the EIS unit. The DL unit can receive documents from the OLB unit and vice versa. The DS unit can upload data to the EIS unit. The DS and EIS units can interconnect to provide document generation. The DTS unit can interconnect with the channels unit to receive documents and document status change notifications and vice versa.

Figure 9A:
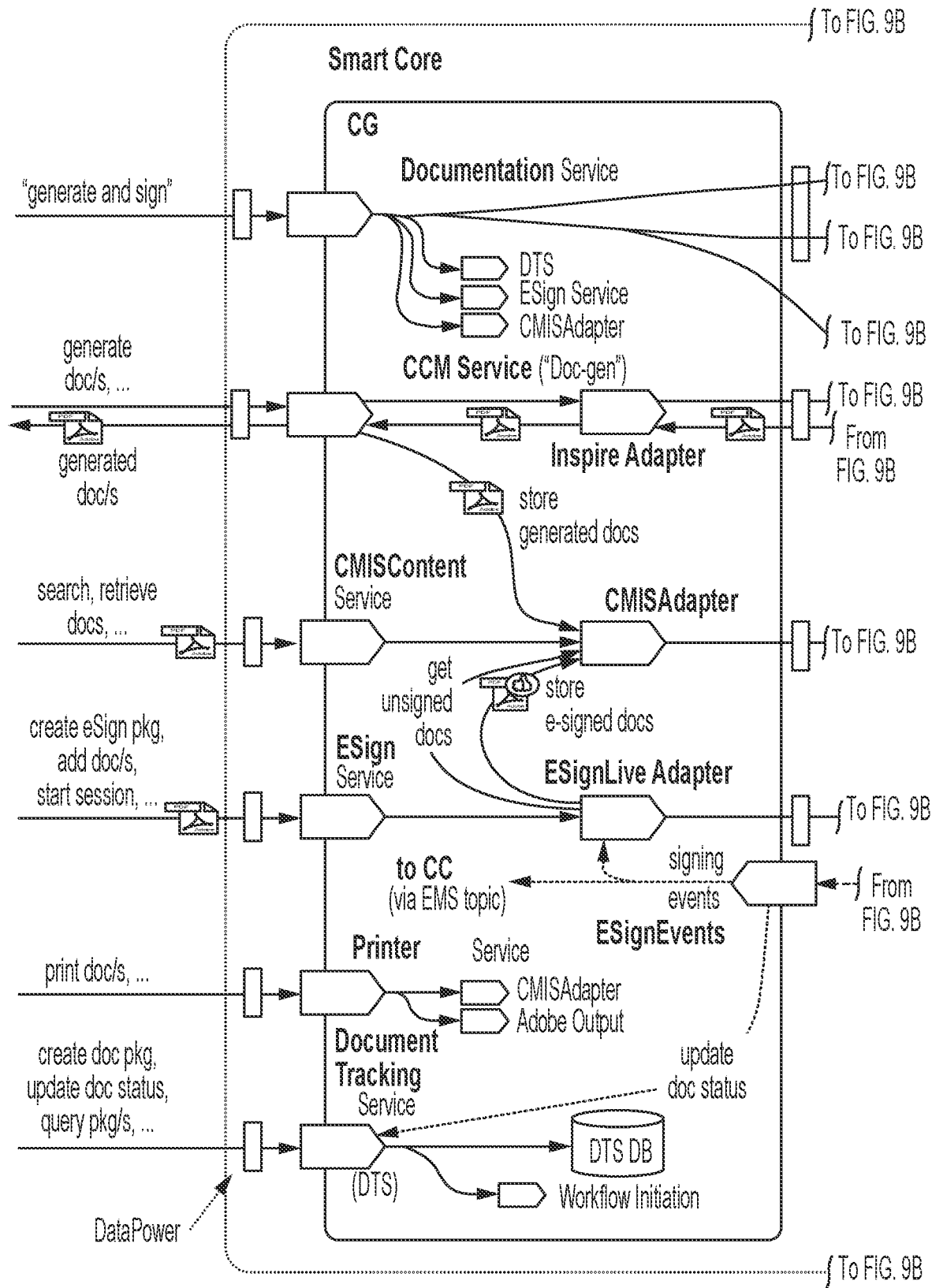
FIGS. 9A-9C illustrate a schematic diagram of a digitization service platform according to some embodiments.
Figure 9B:
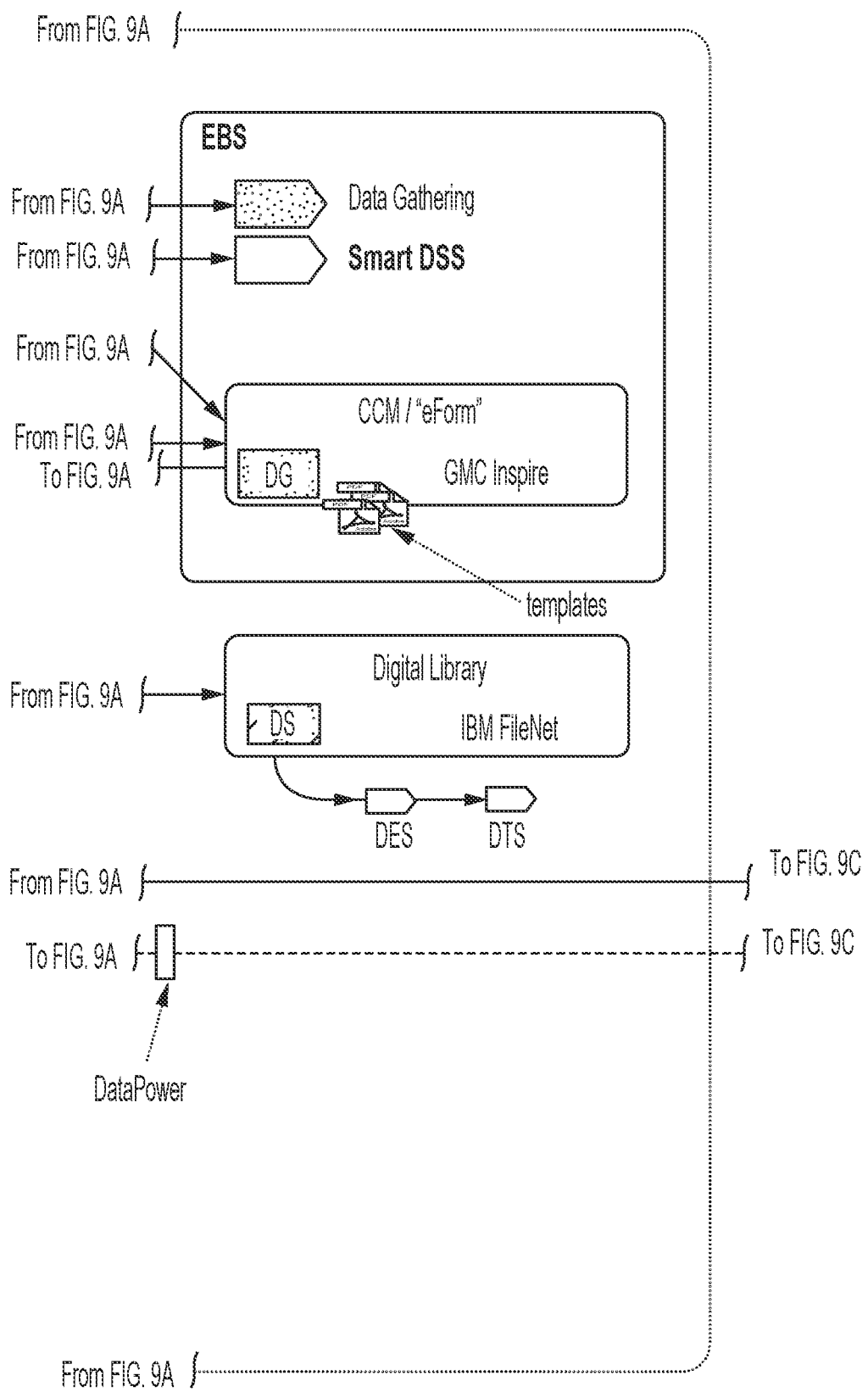
Figure 9C:
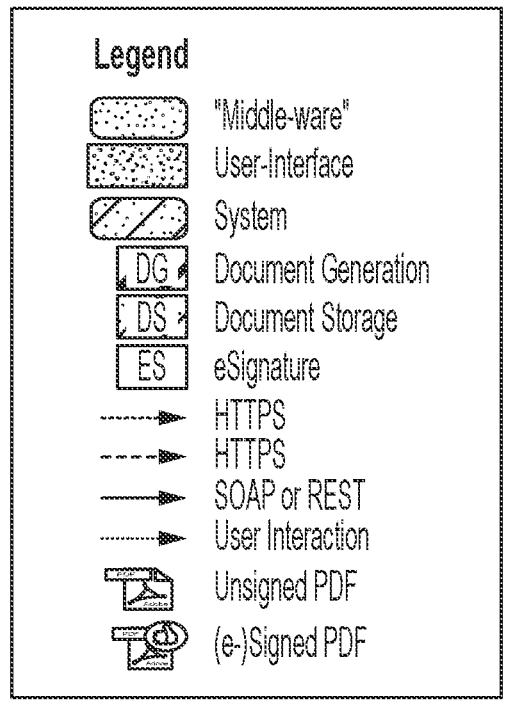
Figure 9C:
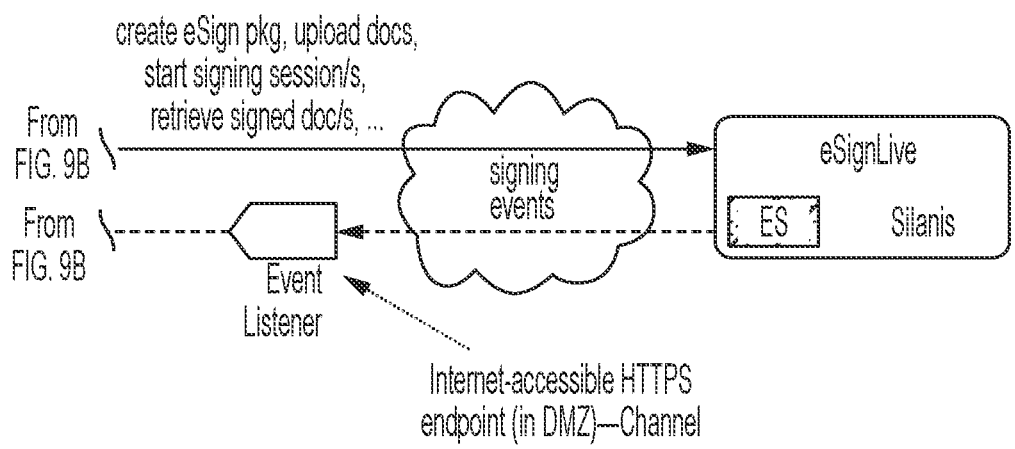

FIGS. 9A-9C illustrate a schematic diagram of an example Document Management and e-Signature key services of a digitization services platform, according to some embodiments. As depicted, the platform can receive a variety of requests. Each request can be managed by a respective service, for example, documentation service, CCM service, CMISContent service, eSign service, printer service, and document tracking service. Each service can be included within a connector grid unit. The CG unit (including various sub-units that can house each service) can interconnect with an enterprise banking system unit, for example, for electronic form services. The CG unit can also interconnect with a digital library. Such interconnection between any of these units can provide document generation, document storage, and/or eSignature services as depicted.

Figure 10:
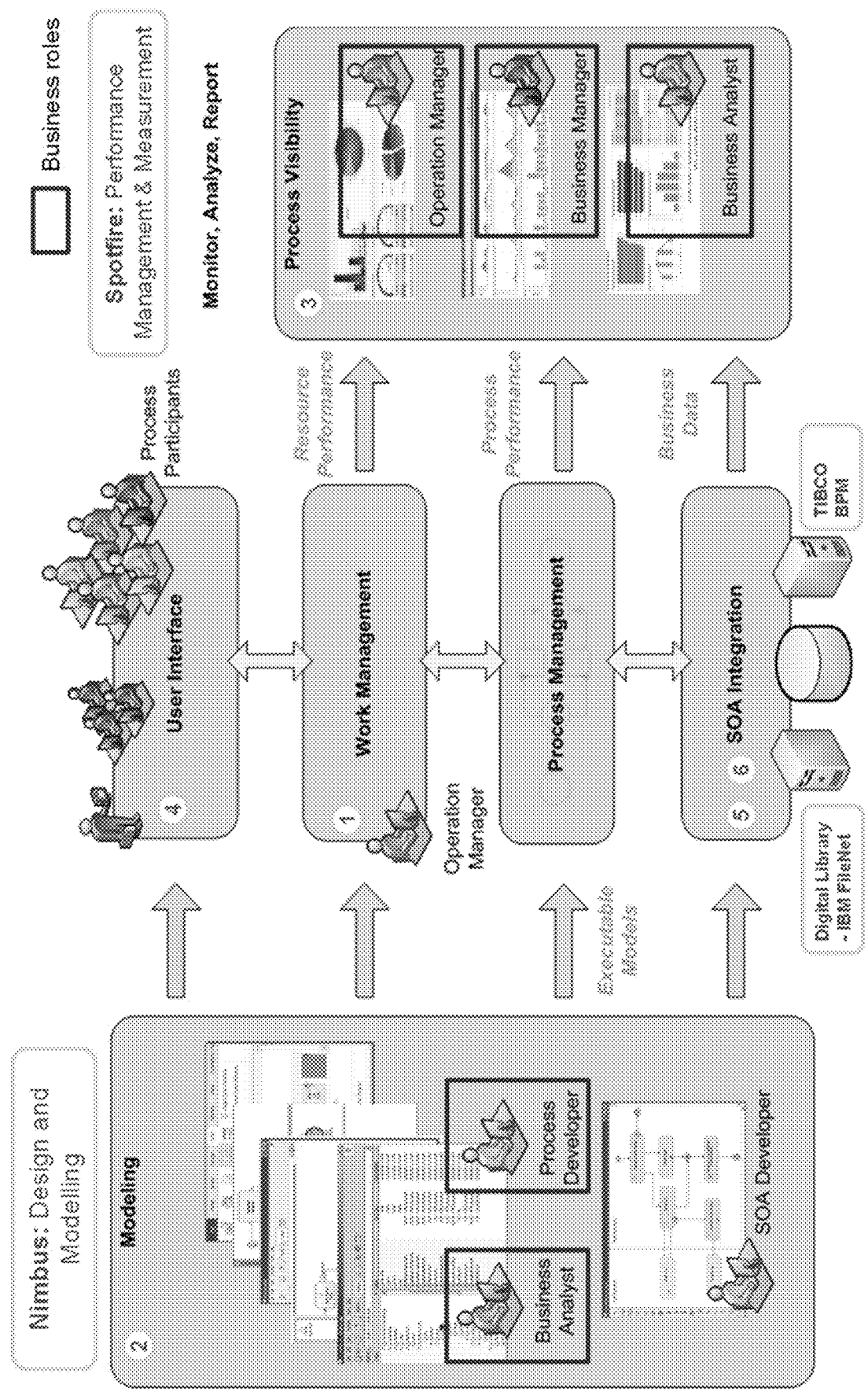
FIG. 10 illustrates a schematic diagram of a digitization service platform according to some embodiments.

FIG. 10 is a schematic diagram of BPM architecture as implemented by a digitization services platform, according to some embodiments. This can include Process Modelling, Execution, Performance Management, and Robotics. As depicted, the BPM architecture can include a work management unit, process management unit, SOA integration unit, user interface unit, modelling unit (for example, receiving data inputs from business analysts, process developers, and SOA developers), and process visibility unit.

Figure 11A:
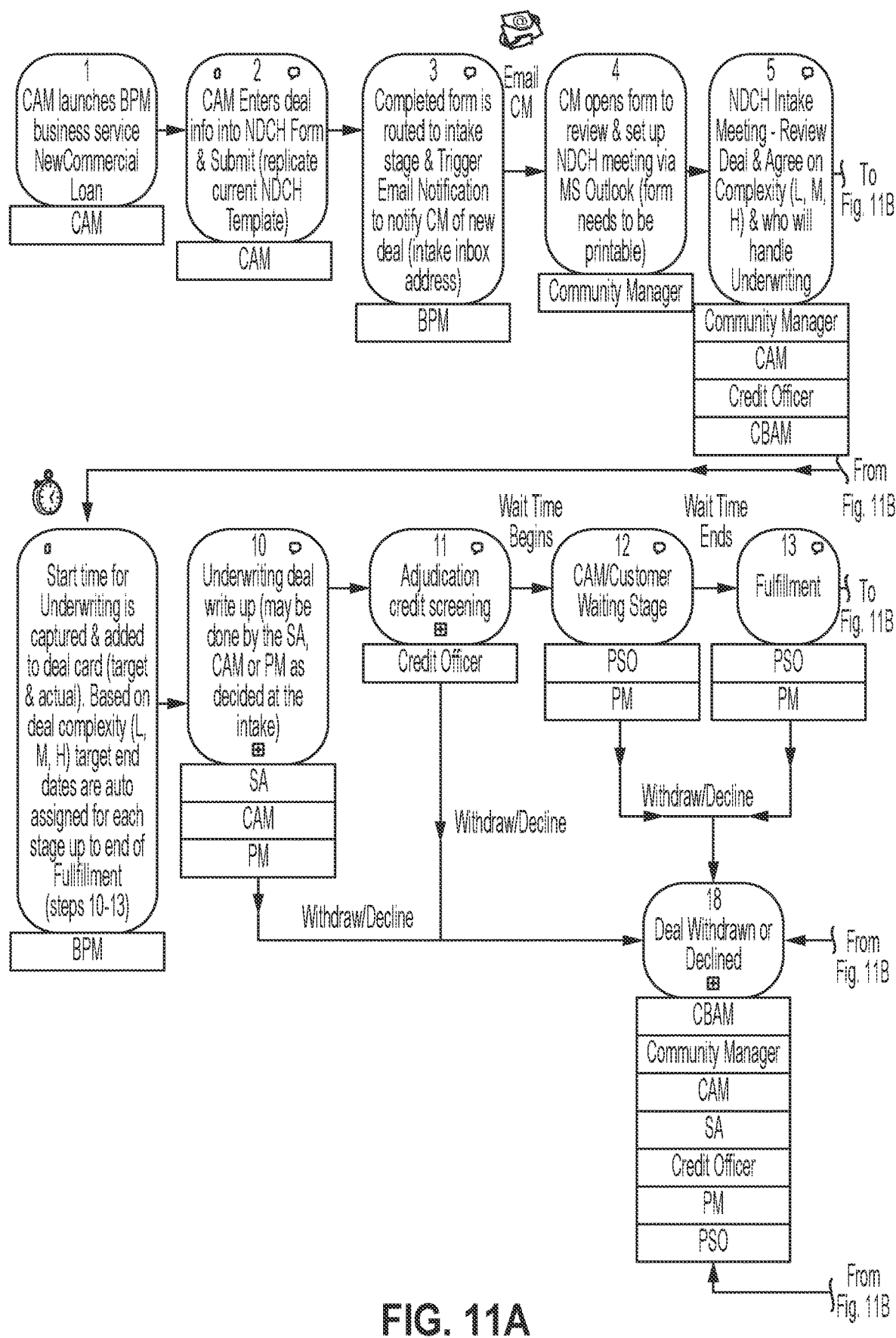
FIGS. 11A and 11B illustrate a flow diagram of a digitization service platform according to some embodiments.
Figure 11B:
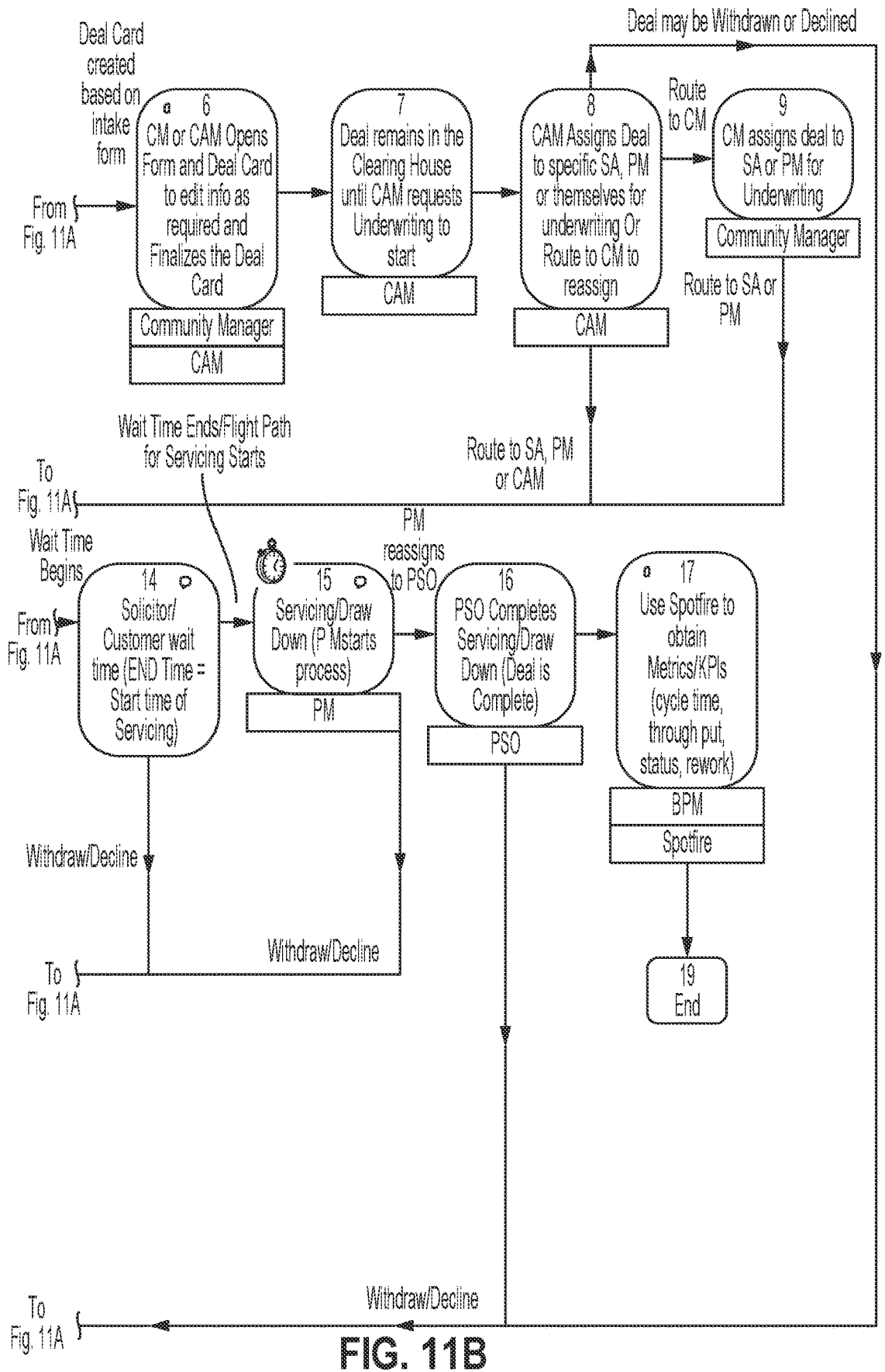

FIGS. 11A and 11B illustrate an example flow chart of an example commercial lending deal cards scenario for process documentation using a digitization services platform, according to some embodiments.

Figure 12:
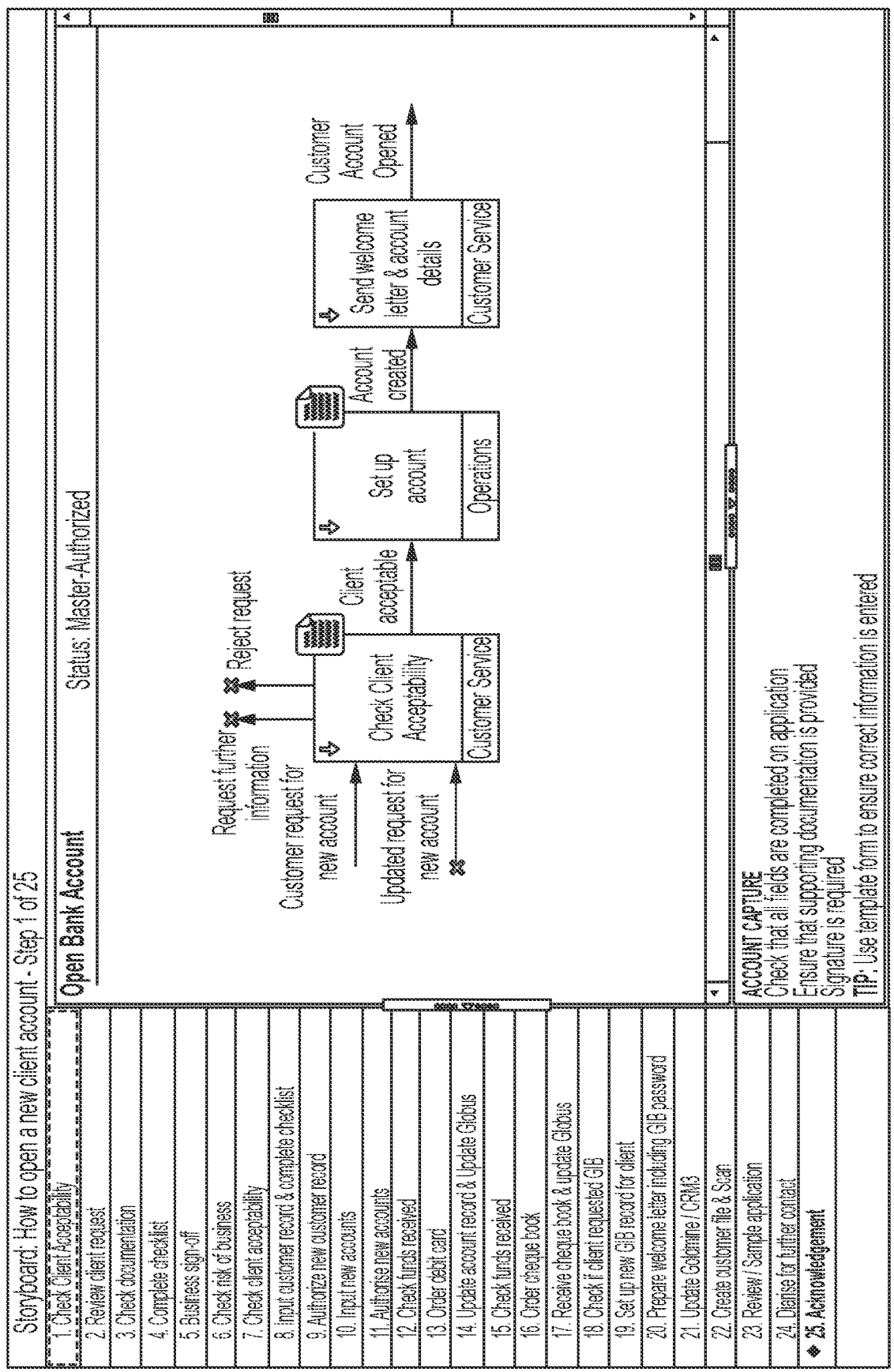
FIG. 12 illustrates a flow diagram of a digitization service platform according to some embodiments.

FIG. 12 is a schematic diagram of an example interface for a digitization services platform, according to some embodiments. The interface can provide Storyboards, which can provide a recorded guided route through a process, allowing users to follow a route or process. This can be used for communicating change, training, and best practices. This can provide a hierarchal process definition with clear accountability at each level, a user-friendly drawing tool to enable collaboration between business experts and business analysts, a repository for process maps and related documentation, along with a browser-based interface accessible by all stakeholders, an ability for process maps to be imported as a baseline flow for process developers, an ability for key performance indicator and service level agreement information to be added to focus process improvement efforts and guide users for performance expectations, and support for governance for process maps.

Figure 13A:
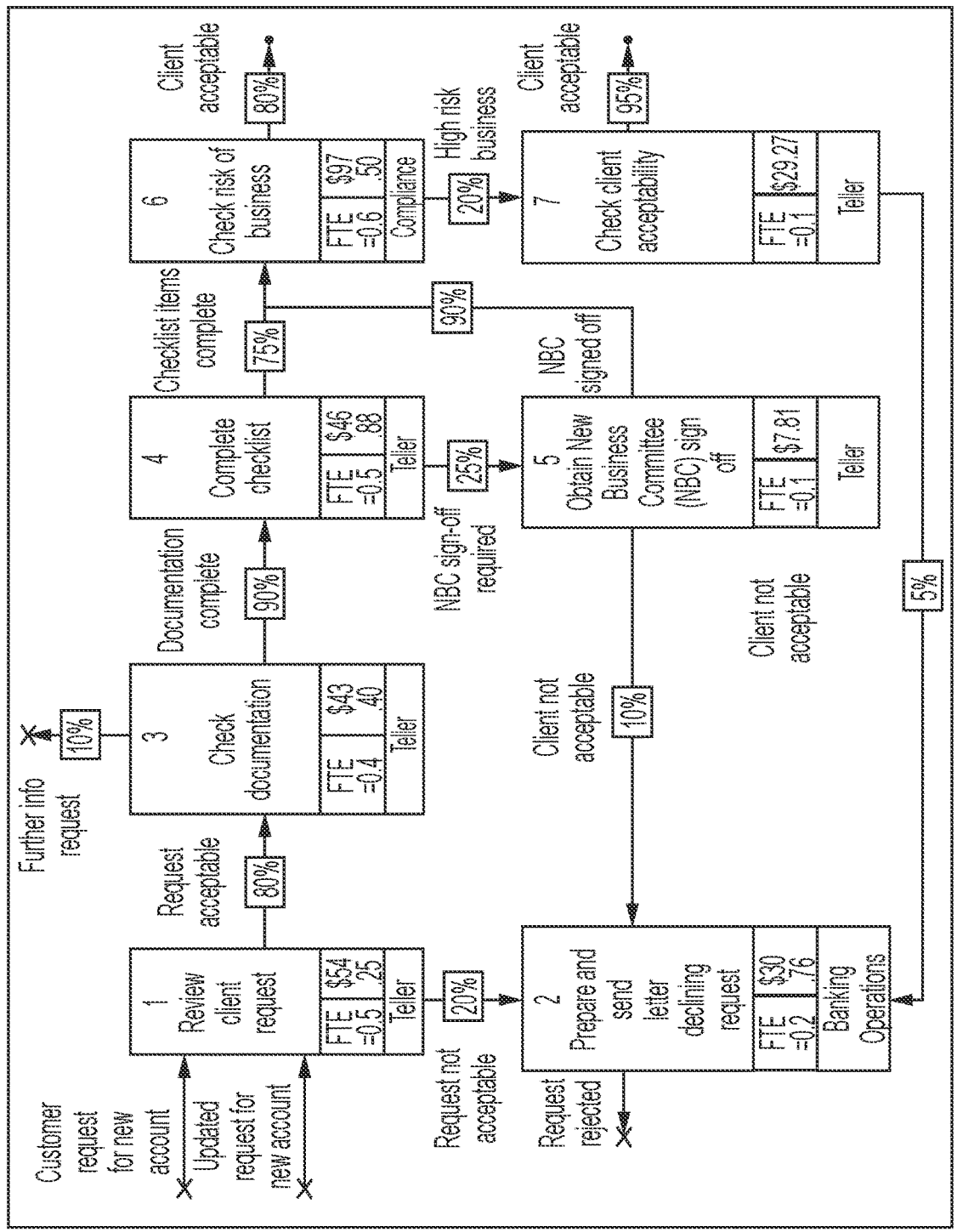
FIGS. 13A and 13B illustrate a flow diagram of a digitization service platform according to some embodiments.
Figure 13B:
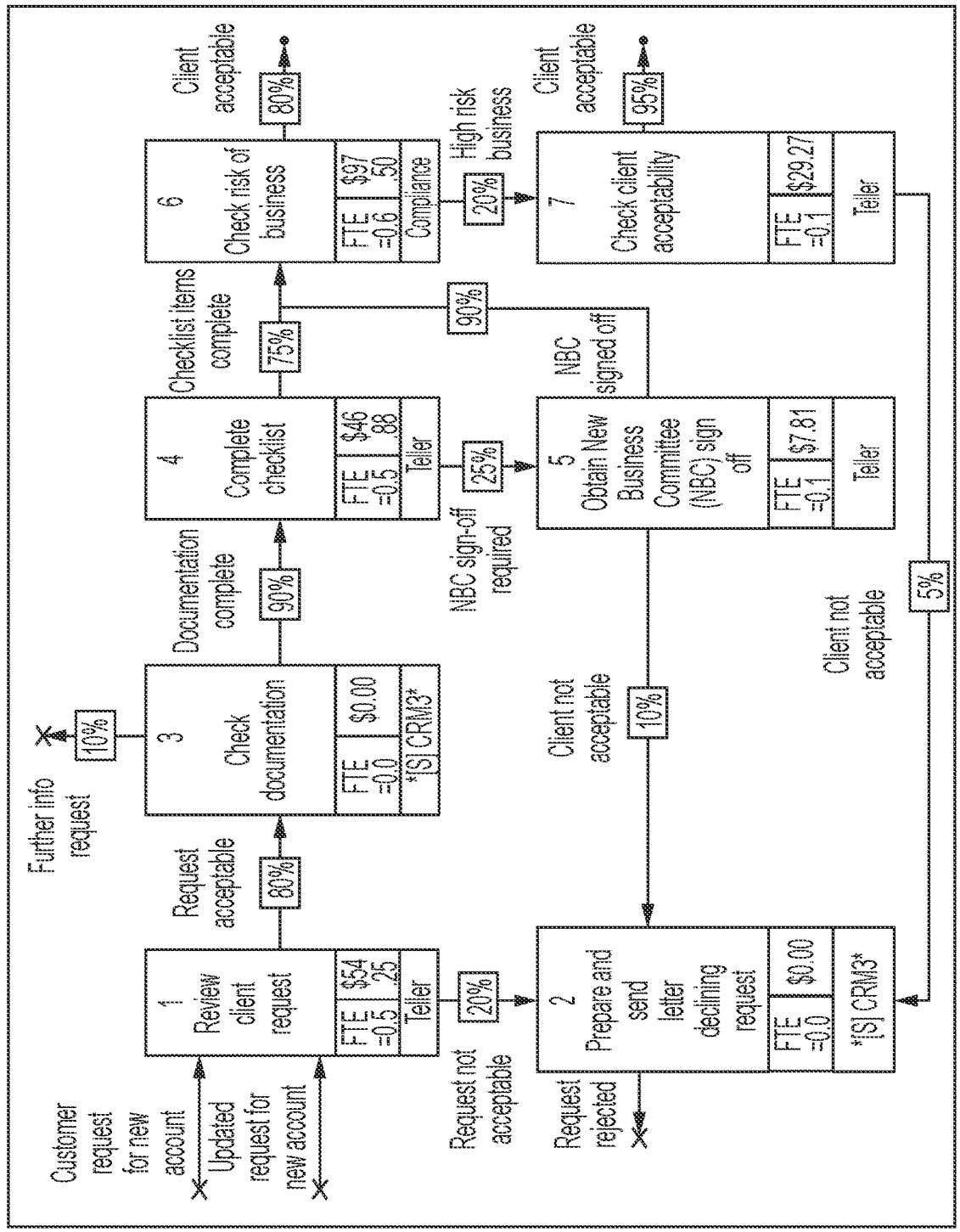

FIGS. 13A and 13B illustrate a schematic diagram of an example process analysis for BPM. Digitization Services Platform can provide an interface to generate the example depicted process schematics before and after scenarios to identify ways to change or improve the process. This can also be used for costed processes to identify savings to be made by "Automating" activities to reduce manual intervention.

Figure 14:
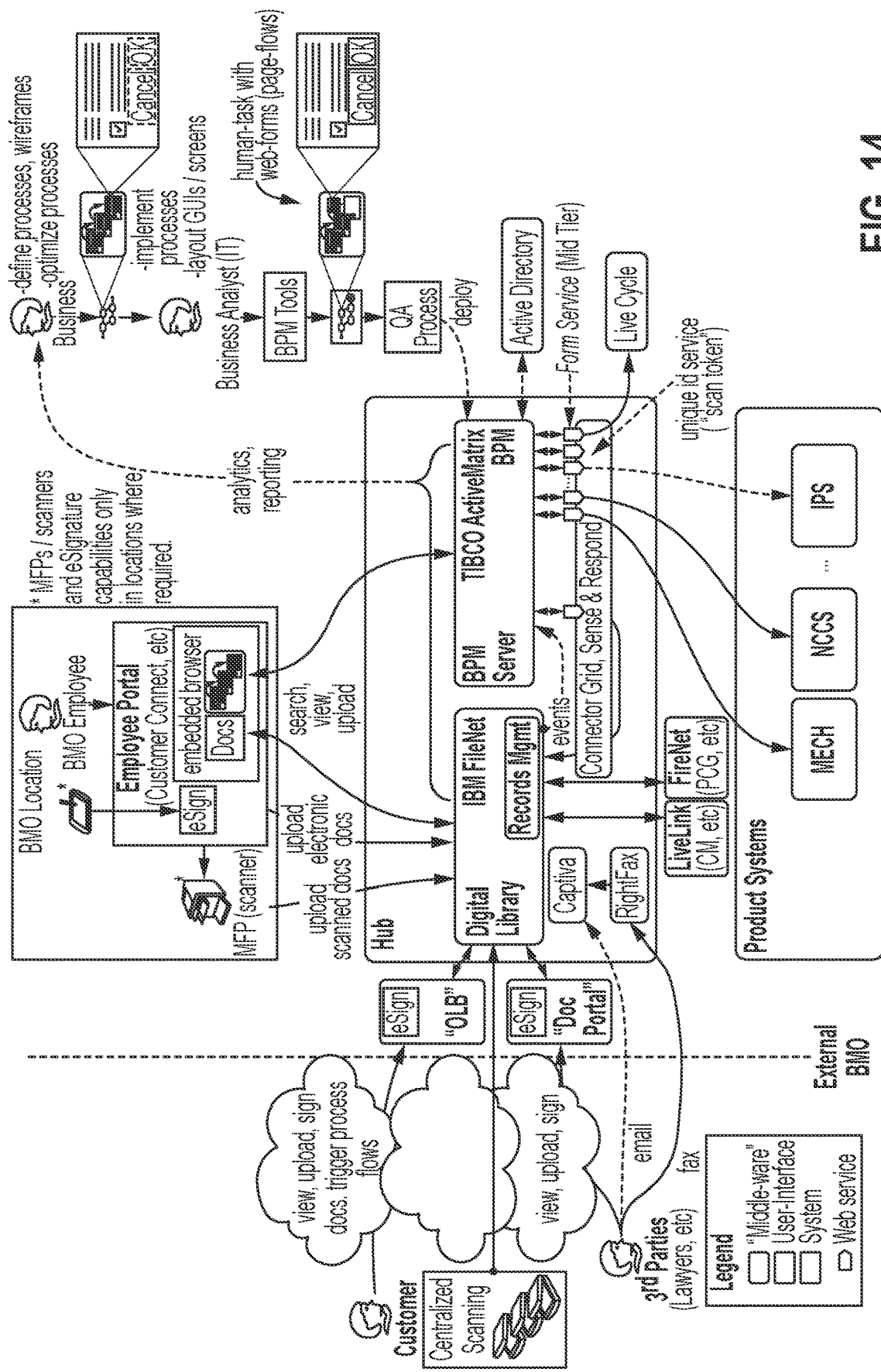
FIG. 14 illustrates a schematic diagram of a digitization service platform according to some embodiments.

FIG. 14 is a schematic diagram of an example architecture for a BPM unit of a digitization services platform, according to some embodiments. A customer or third parties can provide data to a Hub, as depicted, for example, to view, upload, or sign documents or to trigger process flows. The data can be received by a OLB unit or a Doc Portal unit, which can provide data to a digital library unit included as part of a Hub. The Hub can also include a BPM server and Connector Grid and Sense and Respond units. Web services can provide an interface between the BPM server and a product systems unit. An organization employee can engage with an employee portal, which can provide eSign capabilities and can upload scanned documents and electronic documents and provide search, view, and upload capabilities through interconnection with the digital library unit, as depicted. The various units can further interconnect to provide the various features as depicted.

Figure 15:
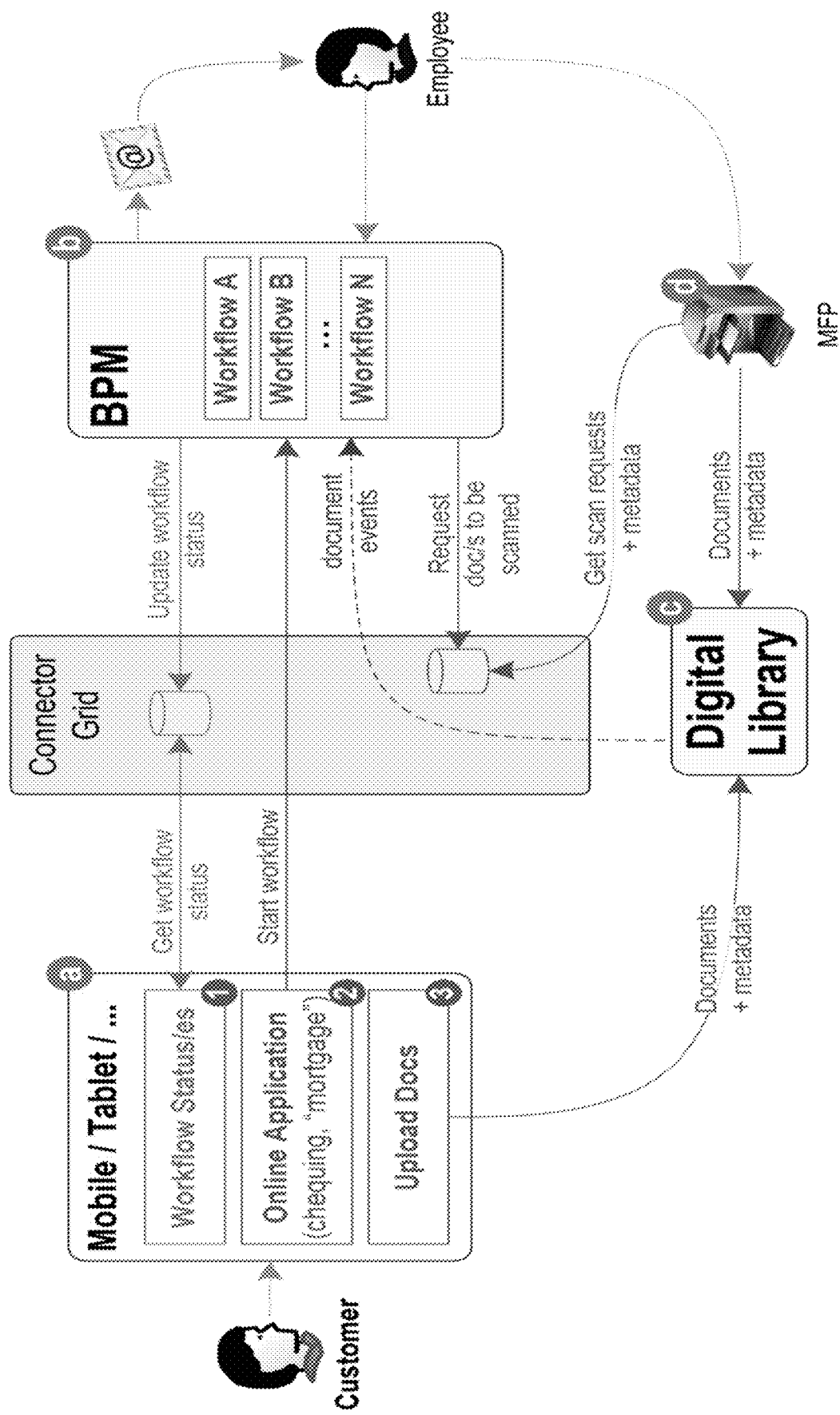
FIG. 15 illustrates a schematic diagram of a digitization service platform according to some embodiments.

FIG. 15 is a flow diagram of an example process for integration using BPM. As depicted, BPM sends a request to Connector Grid unit for documents to be scanned. BPM unit can also send a request to update workflow statuses at Connector Grid. Connector Grid can request a workflow status at a customer unit. The customer unit can request a workflow to be started at BPM unit. The customer unit can upload documents and metadata to a digital library unit, which can also receive documents and metadata from a MFP unit, which can send scan requests and metadata to the Connector Grid. The Connector Grid can include one or more databases for storage of data.

Figure 16:
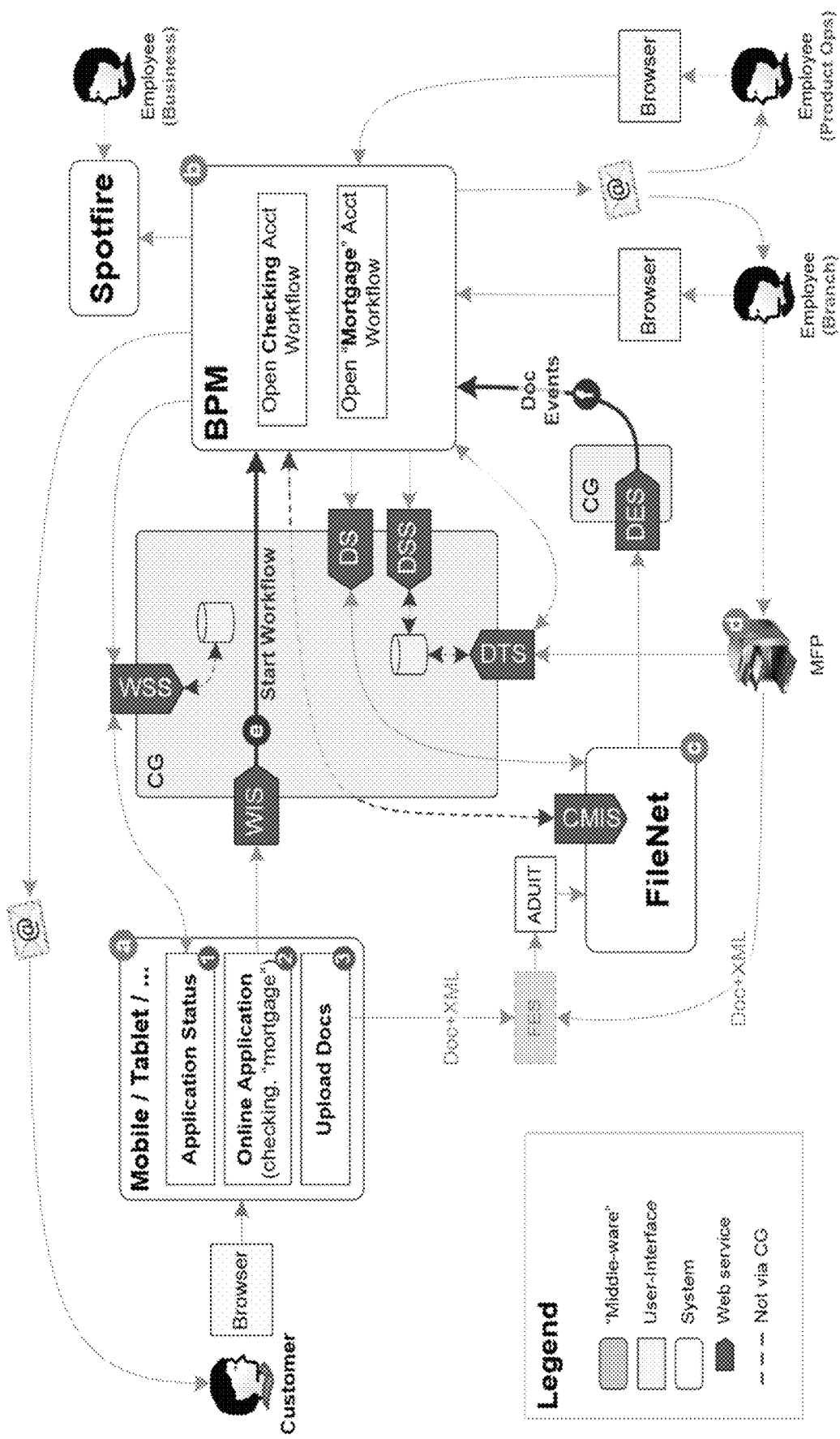
FIG. 16 illustrates a schematic diagram of a digitization service platform according to some embodiments.

FIG. 16 is a flow diagram of an example BPM process of key services for a digitization services platform, according to some embodiments. As depicted, a customer engages with a browser interface, which provides various functionalities such as application statuses, access to online applications, and uploading documents. The browser interface is displayed through a device such as a mobile unit or tablet. The device provides data to a Connector Grid unit, BPM unit, and FileNet unit as depicted. Such data can be processed through respective web services and in response to various requests generated by respective units. As depicted, employees from various departments or lines of business within the organization can likewise engage with a browser to provide data to the BPM unit. The BPM unit can open a checking account workflow or a mortgage account workflow on request received a device receiving input from a customer, for example. The BPM unit can also engage with a Spotfire unit. The FileNet unit can also engage with a document event service provided by a separate CG unit, for example. An MFP unit can provide document and XML data to a File Exchange Server unit, which can provide data to an audit unit, which can provide data to the FileNet unit.

In some embodiments, Workflow Initiation and Workflow Status services provide an ability to launch workflows in BPM from channels (e.g. mobile, tablet) and/or an ability for customers to see workflow statuses within channel applications.

The abbreviations depicted in the figure have the following meanings: Workflow Initiation Service (WIS); Workflow Status Service (WSS); Document Service (DS); Document Event Service (DES); Document Set Service (DSS); Document Tracking Service (DTS); and Content Management Interoperability Services (CMIS).

Examples of Process Performance Management using TIBCO Spotfire will now be described.

Figure 17:
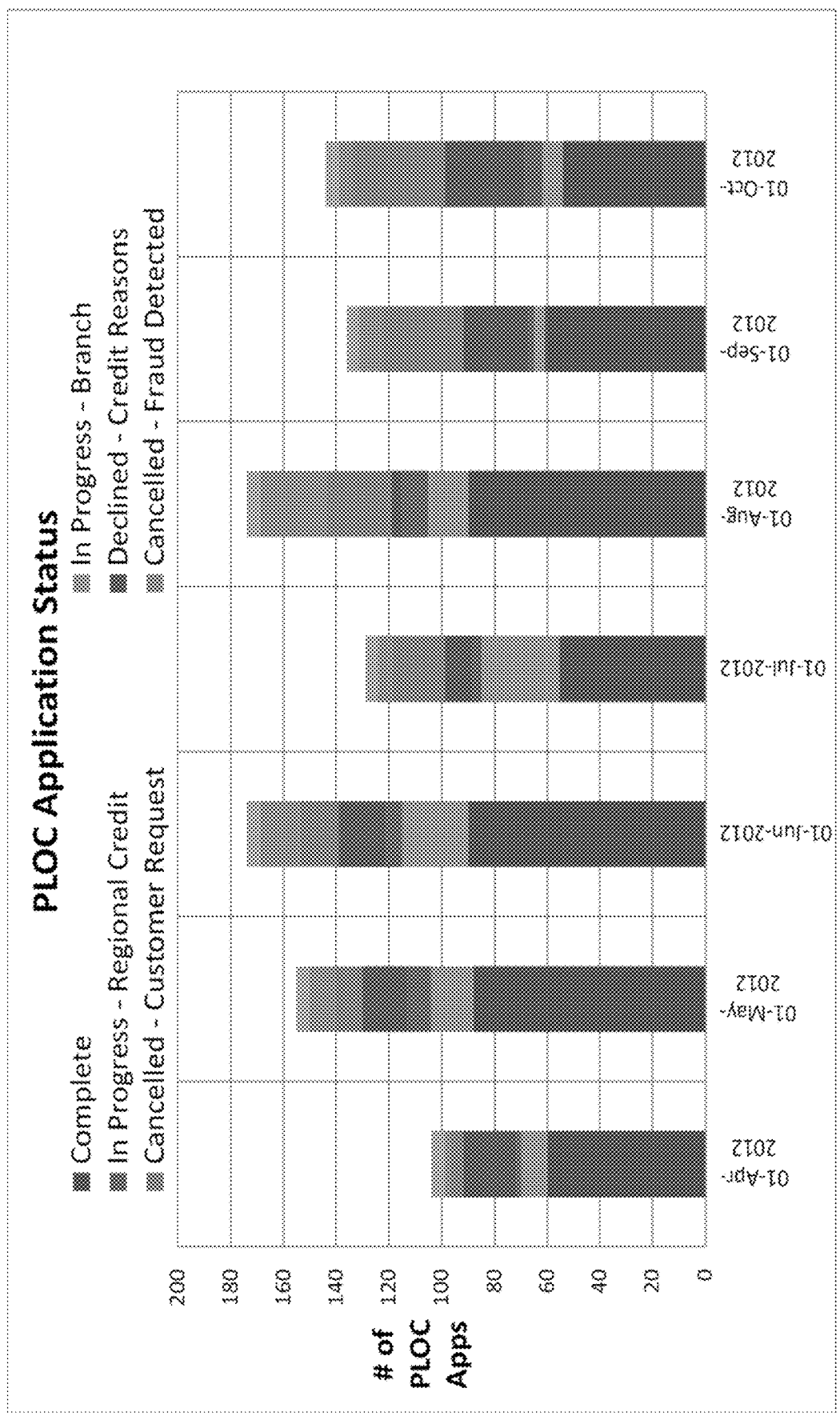
FIG. 17 illustrates an example interface of a digitization service platform according to some embodiments.

FIG. 17 is a chart depicting an example display for a volume monitoring process, according to some embodiments. The volume monitoring process can include retrieving an application status at each step in the workflow—e.g., Branch & Operations managers to monitor volume. This can be configured to be viewed intraday (i.e. hourly) or daily, weekly, monthly intervals as required.

Figure 18:
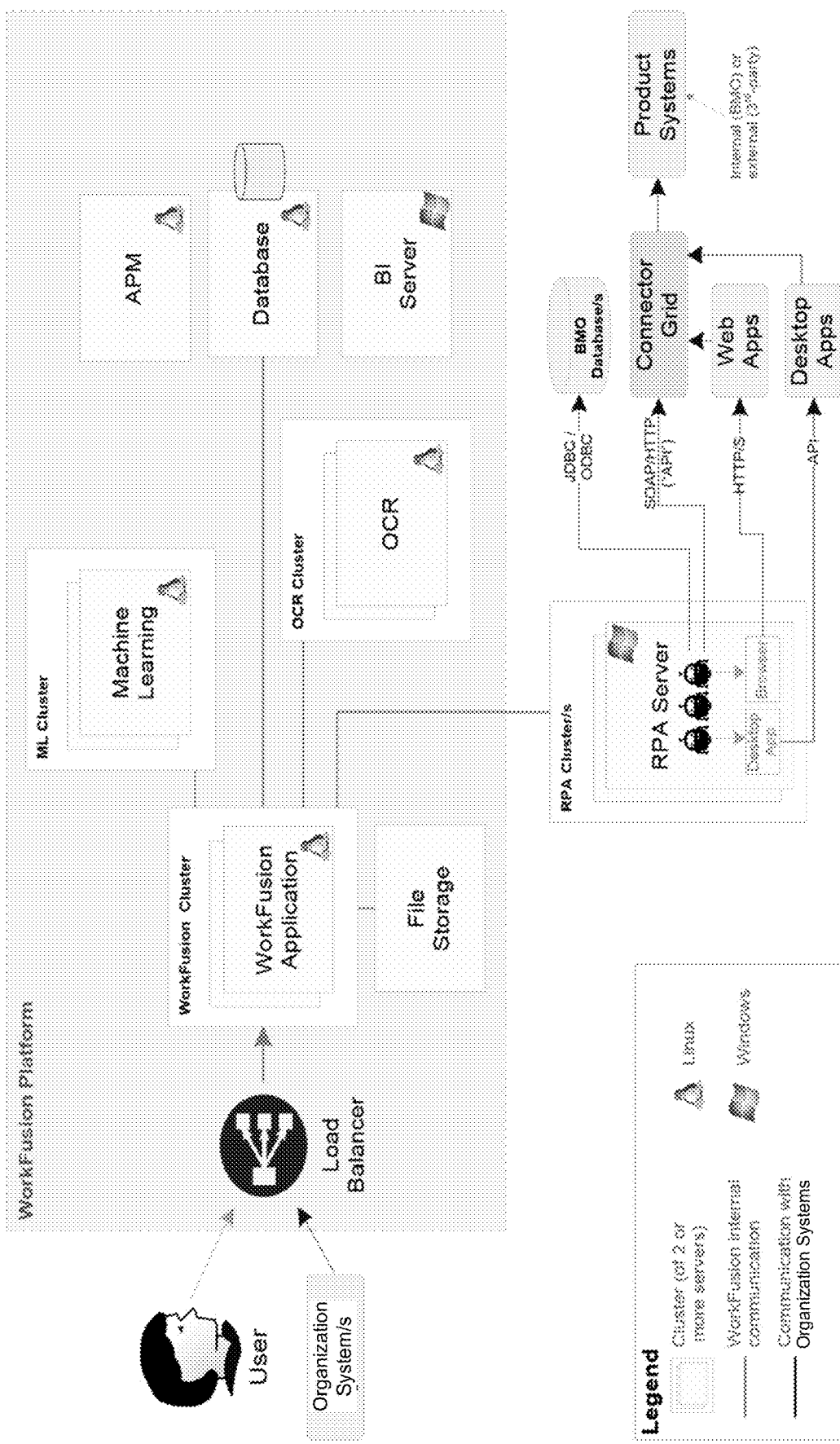
FIG. 18 illustrates a schematic diagram of a digitization service platform according to some embodiments.

FIG. 18 is a schematic diagram of an example logical architecture for Robotic Process Automation, according to some embodiments. As depicted, the architecture includes a WorkFusion Platform, which a user device or organizational system can provide input data to or otherwise engage with. The WorkFusion Platform includes a load balancer, WorkFusion Cluster unit (including one or more WorkFusion Applications), File Storage unit, ML Cluster unit (including one or more machine learning units), OCR Cluster unit (including one or more OCR units), databases, business intelligence servers, and application portfolio management units. The WorkFusion Cluster unit can interconnect with one or more robotic process automation Clusters, including one or more RPA Servers, each of which can provide data (according to various protocols such as JDBC/ODBC; SOAP/HTTP; HTTP/S, etc.) to one or more of each of organization databases, Connector Grid units, Web Applications, and Desktop Applications. The connector Grid unit can provide data to the organization or a third party's Product Systems unit.

Figure 19:
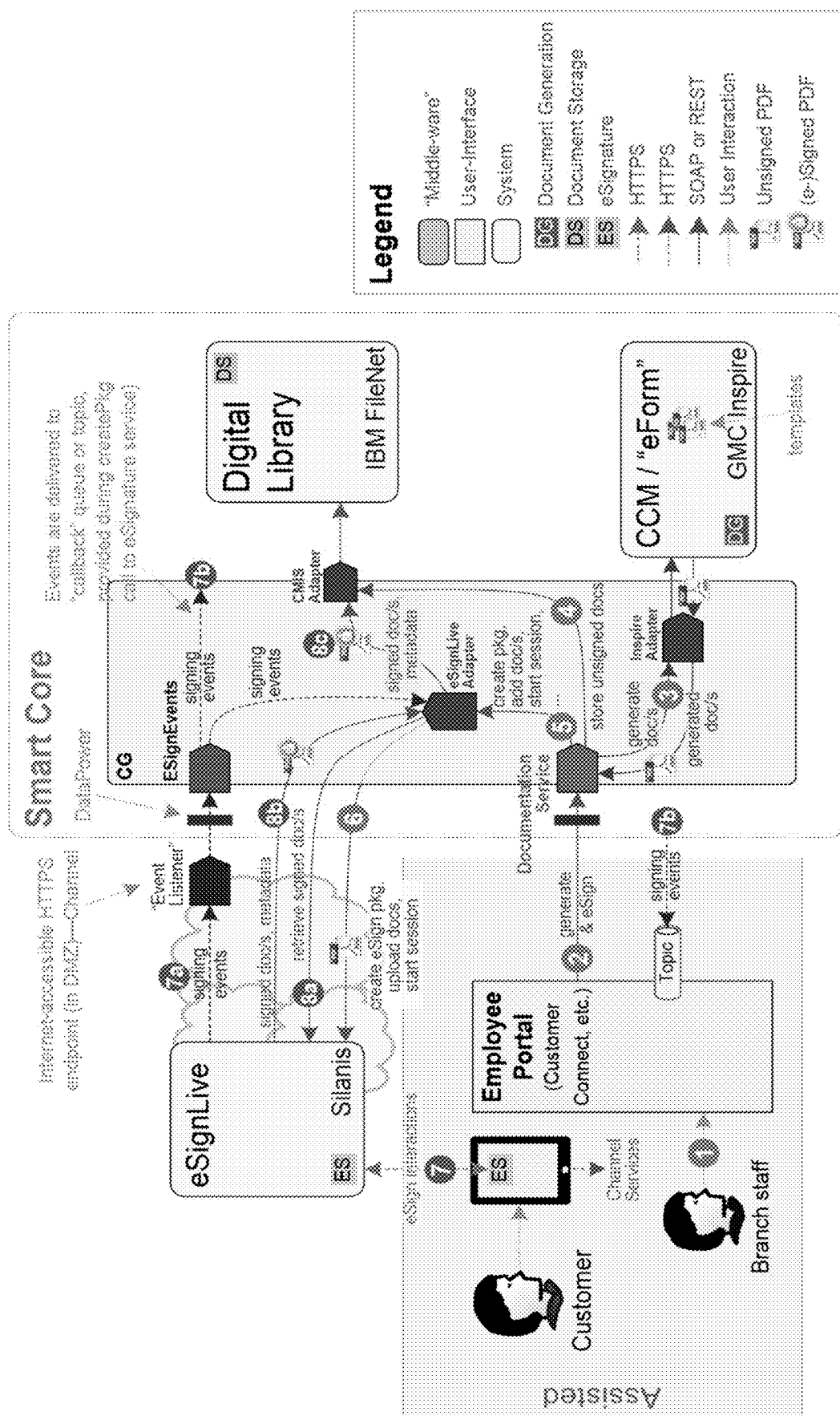
FIG. 19 illustrates a schematic diagram of a digitization service platform according to some embodiments.

FIG. 19 is a schematic diagram of an example architecture implementing an eSignature (Assisted Channel) use case for a digitization services platform, according to some embodiments. The architecture can include an Employee Portal unit, signature unit, and IDP. The IDP can include a CG unit, Digital Library unit, and CCM/eForm unit. Each of these units can interconnect as depicted to provide the various depicted functionalities using the various depicted protocols and sequences.

Figure 20:
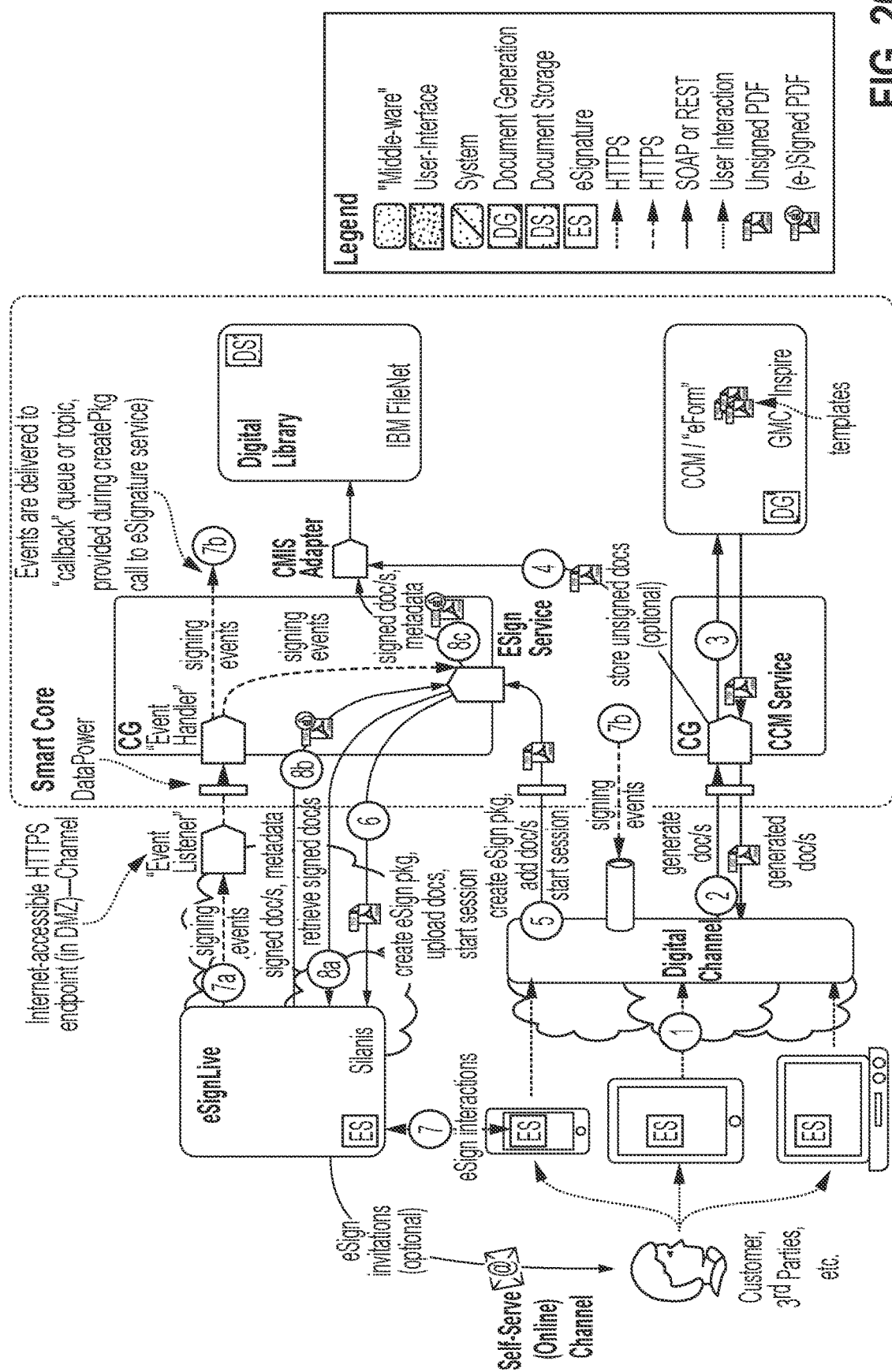
FIG. 20 illustrates a schematic diagram of a digitization service platform according to some embodiments.

FIG. 20 is a schematic diagram of an example architecture implementing an eSignature (Online Channels) use case for a digitization services platform, according to some embodiments. Specifically, depicted is a Digital Channel using the CCM Service and eSignature Service as two distinct web-services (and two invocations). The Documentation Service allows channel applications, BPM, etc. to generate documents needed for a particular product as well as initiate e-Signature for relevant documents in a single web-service call. The "one-stop shop" Documentation Service, however, might not be reusable (or desired) in particular use-cases, in which case the CCM and ESign Services can be utilized as "standalone" services, as depicted here. The architecture can include an signature unit, Digital Channel unit, and SmartCore, which can include one or more CG units, a Digital Library, and a CCM/eForm unit.

Figure 21:
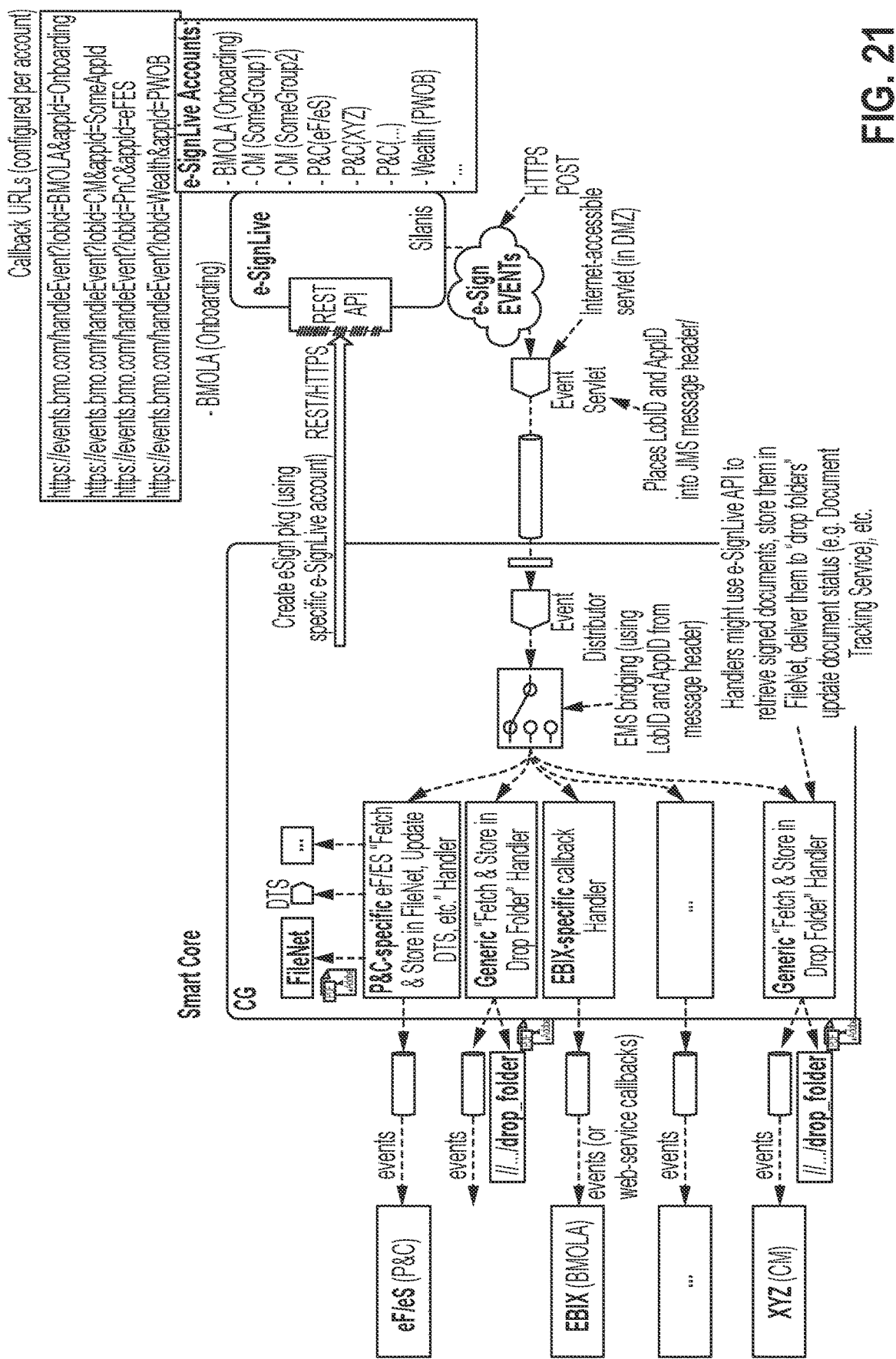
FIG. 21 illustrates a schematic diagram of a digitization service platform according to some embodiments.

FIG. 21 is a schematic diagram of an example architecture implementing Event Handling for an e-Signature functionality. As depicted, the platform can include a CG unit, with the various depicted handlers. Each handler can provide event data to one or more external units, as depicted. The CG unit can also create an eSign package using a specific account and provide same to an external signature unit using a REST/HTTPs protocol. The signature unit can provide eSign Events to an event servlet to provide same to an event distributor unit included as part of the CG unit.

Example embodiments of Hub E-Forms and ESign Services as part of a Hub will now be described in further detail.

Enterprise Core Standards can include a Document Management Product Standard (STD-0081-01) and a Hub SOAP Message Format (STD-0105-01).

Embodiments described can provide e-Signature Services that support enterprise-wide reuse.

In some embodiments, there may be a set of electronic forms, a Customer Communication Management (CCM), "eForms" platform and e-Signature platform along with channel interaction.

Figure 22:
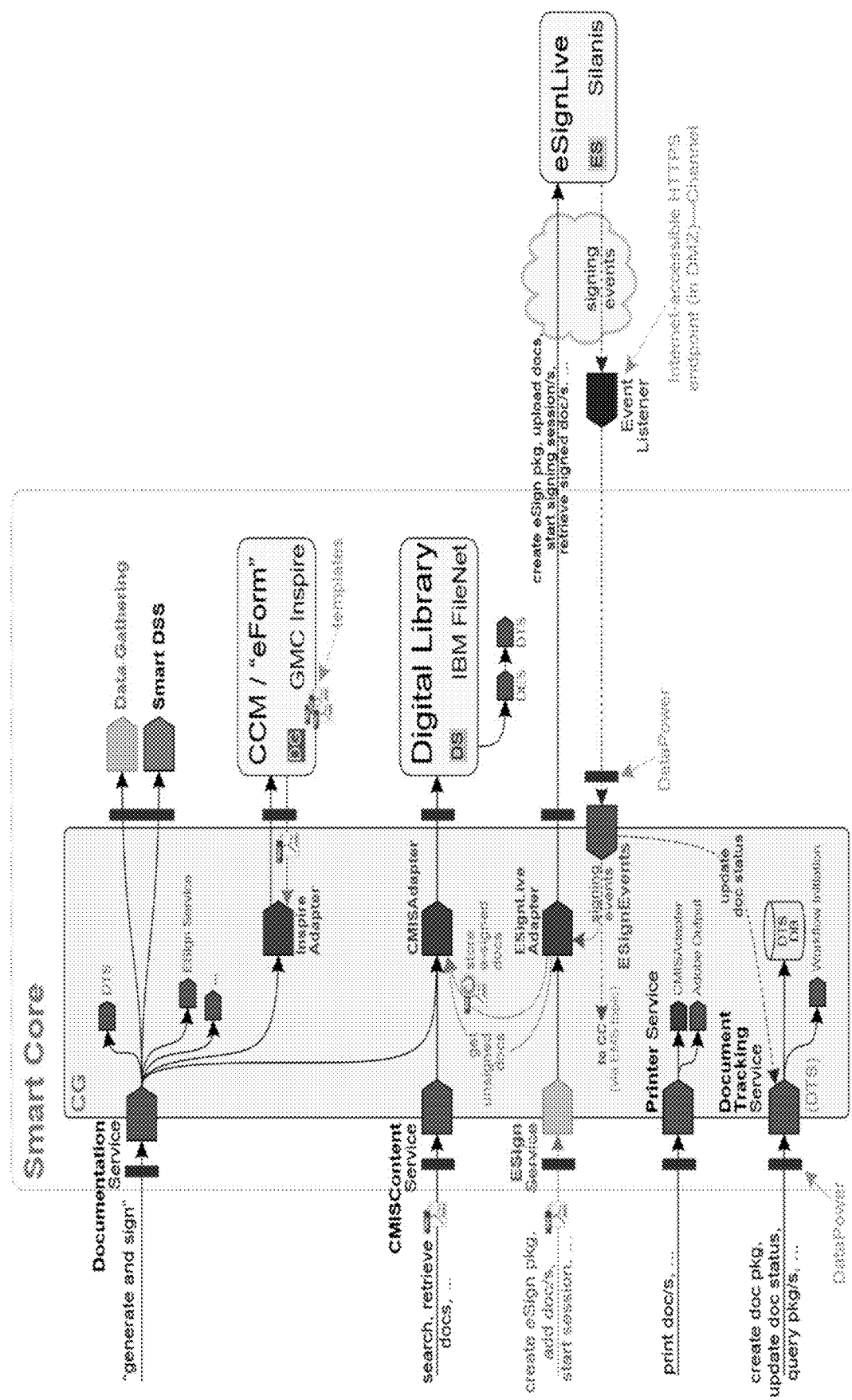
FIG. 22 illustrates a schematic diagram of a digitization service platform according to some embodiments.

FIG. 22 is a schematic diagram of an example state of an e-Signature architecture, according to some embodiments. As depicted, the platform can receive data via a variety of respective services and can include a CG unit and various other units.

Figure 23:
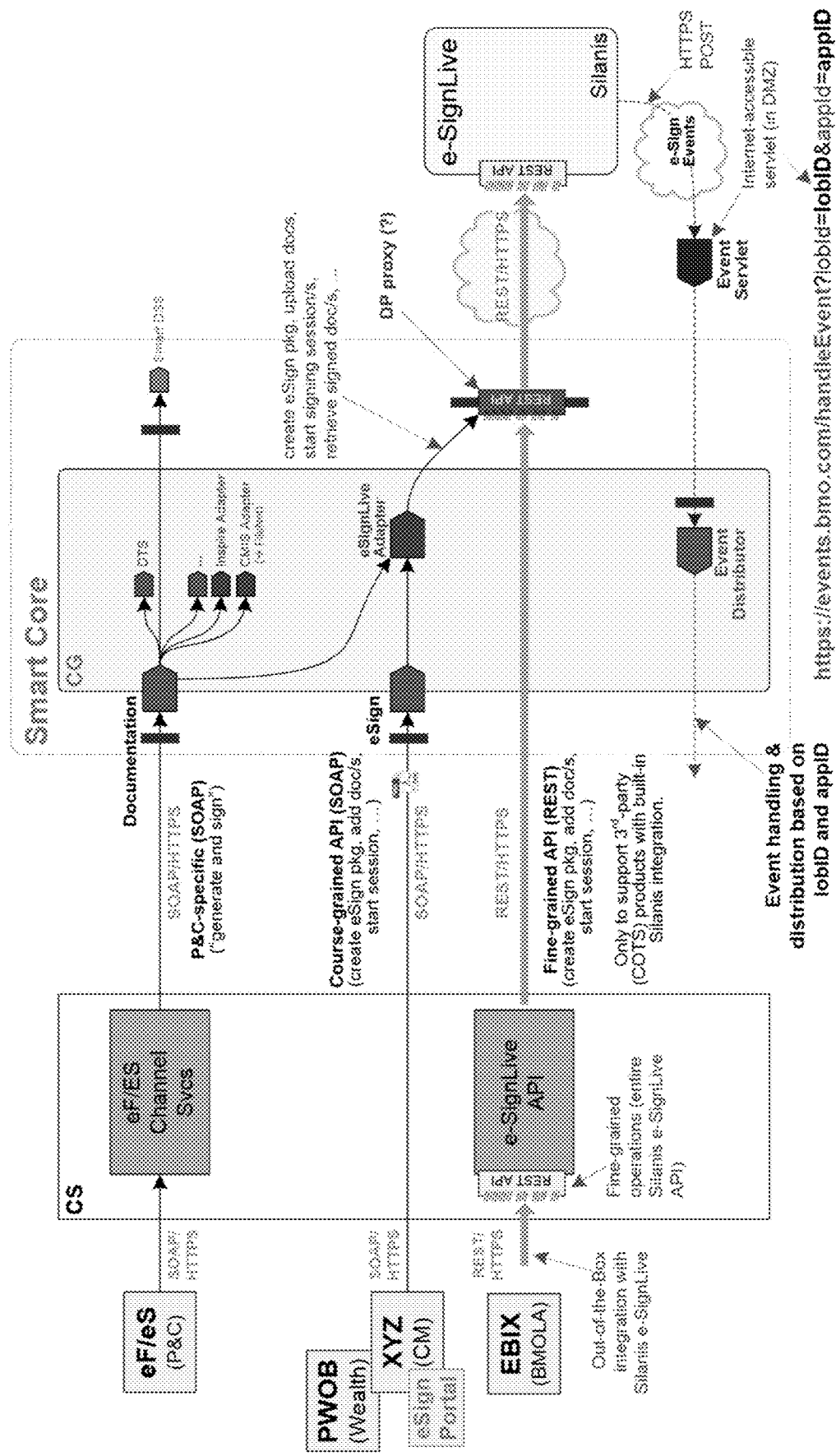
FIG. 23 illustrates a schematic diagram of a digitization service platform according to some embodiments.

FIG. 23 is a schematic diagram of an example state of an e-Signature architecture, according to some embodiments. As depicted, the platform can receive data via a variety of respective services from a corporate services unit.

Other service, such as the Document Event Service (DES), Employee Notification Service, play a part in the overall eForms and e-Signature implementation, but have been omitted from this diagram. In addition, existing services supporting Branch Scanning, though used by eForms and e-Signature services, are not displayed. The EICEmployee service is also not depicted.

Figure 24:
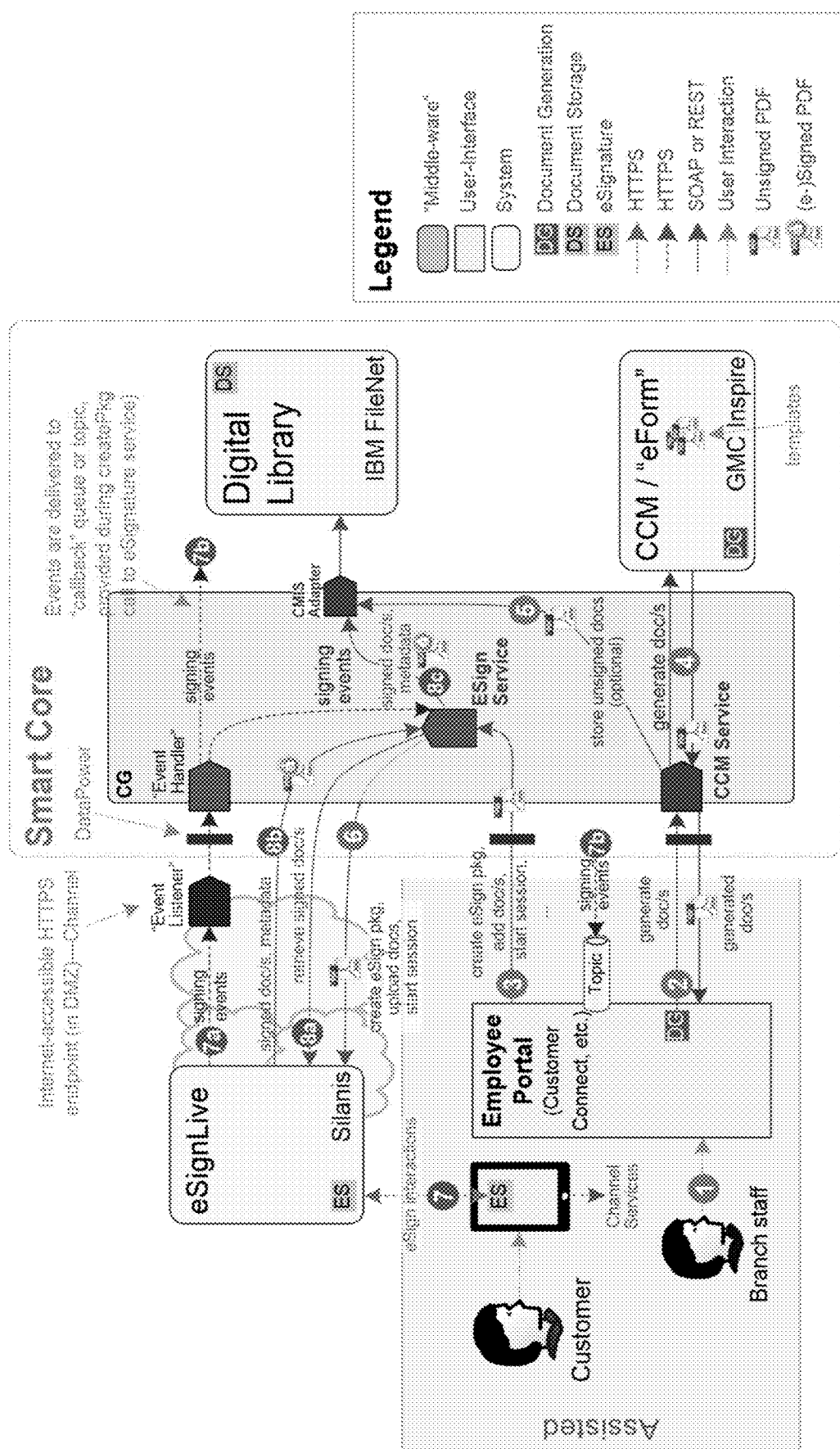
FIG. 24 illustrates a schematic diagram of an example architecture of a digitization service platform according to some embodiments.

FIG. 24 depicts an example architecture for an eSignature Service (Assisted Channel, ESign and CCM Services). Specifically, there is depicted an Employee Portal (e.g. Customer Connect) using the CCM Service and eSignature Service as two distinct web-services (and two invocations).

The context of an example Documentation Service according to some embodiments of a digitization services platform is to provide a "one-stop shop" service to channels, allowing documents to be generated, stored in the Digital Library, and submitted for electronic signature.

The scope includes a GenerateAndESign unit, which generates documents associated with a specified product, stores the unsigned documents in the Digital Library, and submits documents to be e-signed for electronic signing; a GenerateAndPrint unit, which generates documents associated with a specified product, stores the unsigned documents in the Digital Library, and sends documents to be "paper" signed to a network-attached printer for printing; a Reassign Packages unit, which reassigns DocumentTrackingService (DTS) document packages from one employee to another; and a RemovePackages unit, which removes the specified DocumentTrackingService (DTS) document packages, along with any e-Sign packages that may exist.

The context of an example Customer Communication Management (CCM) ("Document Generation") Service according to some embodiments of a digitization services platform is to provide the means for applications (such as Customer Connect, the Digital Channel, BPM, etc.) to generate documents (typically output as PDFs), returning generated documents to the caller and/or storing them in the Digital Library and/or placing them into a user-specified output folder.

The scope includes a Generate Documents unit, which can generate one or more documents, either returning them to the caller (as attachments), or storing them in the Digital Library or a caller-specified output folder.

The context of an example Document Tracking Service according to some embodiments of a digitization services platform is to provide an ability to track acquisition, scanning and/or electronic signing of documents, as well as state management and query capabilities.

The platform includes an AddPackagesToPendingPackages unit, which changes the status of document packages to "pending"; a QueryMyPendingPackages unit, which allows a caller to query pending document packages; and a RemovePackagesFromPendingPackages unit, which removes the specified packages from the pending state.

Figure 25:
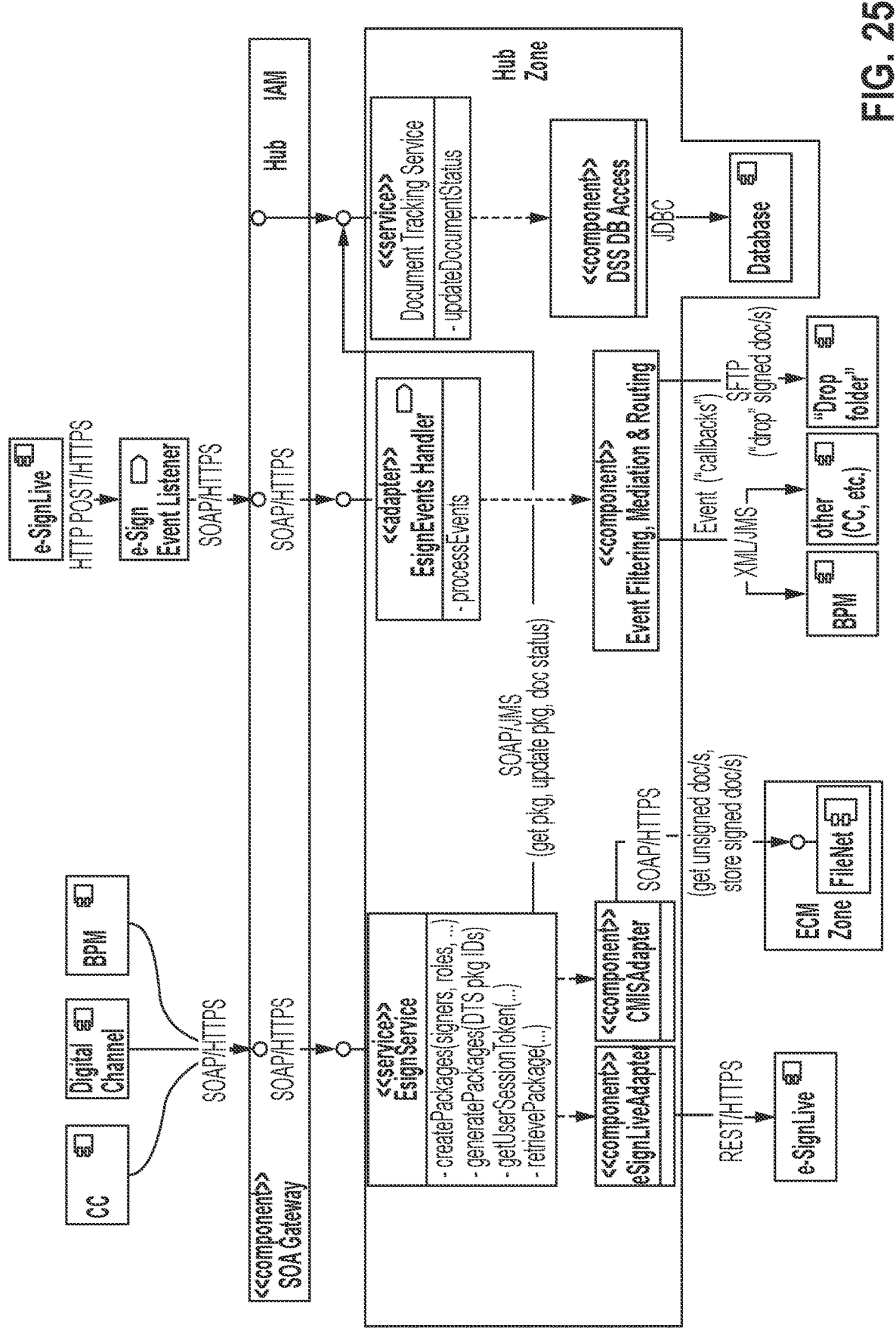
FIG. 25 illustrates a schematic diagram of a digitization service platform according to some embodiments.

FIG. 25 is a schematic diagram of an example architecture for Component Interaction between ESign Service, Handlers, and Document Tracking services. The diagram provides a component-interaction view of the ESign and Document Tracking services, and ESignEvents handler.

In some embodiments, there is provided a Documentation Service, which can interconnect with various components.

Embodiments described herein can provide operational logging and auditing services.

FIG. 25 is a schematic diagram depicting some embodiments where Hub services involved in eForms are e-Sign processing can log component health and transaction processing to support operational monitoring.

In addition, as depicted, access to documents stored in the Digital Library (whether by customers via OLB, or by employees via the UI and/or Customer Connect) is to be recorded for audit purposes. This may be that the CMIS-Content adapter produce an audit log of customer access to documents, and that the Digital Library produce and audit log of employee document access.

Figure 26:
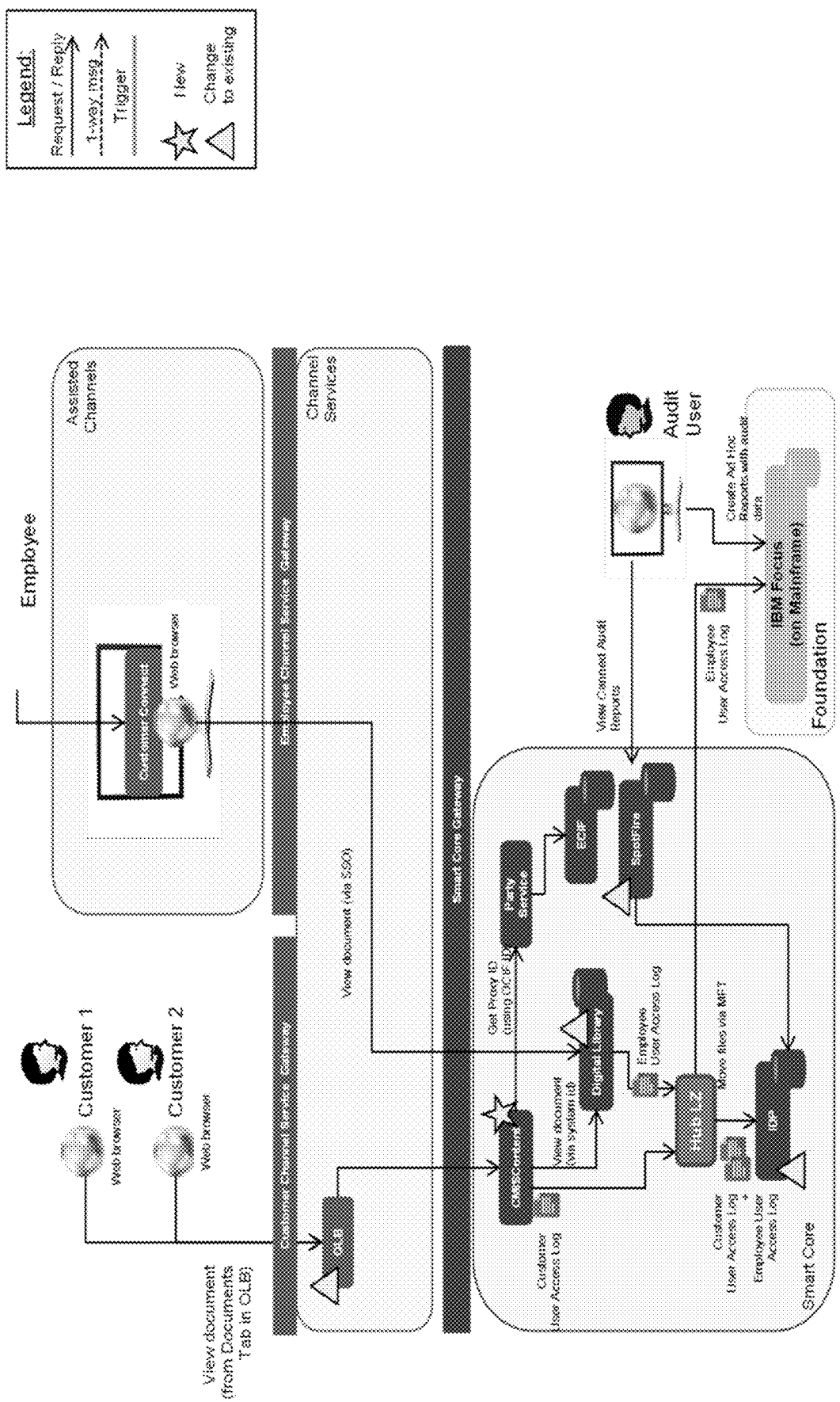
FIG. 26 illustrates a schematic diagram of a digitization service platform according to some embodiments.

FIG. 26 is a schematic diagram of an example architecture for an Audit Logging and Reporting service of a digitization services platform, according to some embodiments. In some embodiments, content management service will log the certain data elements for audit reporting relating to customer document accesses; content management service can log the Proxy ID of the customer user accessing documents from the Digital Library; the Digital Library can log the user IDs of employee user access; the Digital Library can log the user accesses for customers; Customer and Employee user access logs are shipped to IDP; and reports can be created to allow audit users to view DL document access activities by customers or employees.

The architecture can include logging accesses to documents in a Digital Library, as well as enabling an audit team to review reports.

This table summarizes some significant architectural and management decisions that may be involved in the design of the architecture.

In some embodiments, adds, changes and deletes to the data can be monitored.

Functions and applications can be changed in any one of the following ways: connection to the HUB via an adaptor; consumption of CIF information from MDM/HUB; consumption Analytic information from HUB and/or Virtual EDW; migration of orchestration to the HUB; migration of business logic to the HUB; migration of presentation logic to the HUB; and movement to strategic standards from non-strategic standards (includes platforms).

According to some embodiments, the following table summarizes system-to-system interfaces between components.

| Source | Destination | Protocol | Sync/Async | Notes |
| --- | --- | --- | --- | --- |
| Browser | ESign Service | HTTPS | Synchronous | Browser-based UI |
| BPM | ESign Service | SOAP/ HTTPS | Synchronous | Workflows running on BPM can create eSign packages, add documents to a package (by specifying FileNet URLs), and invite customers to sign. |
| Customer Connect, Digital Channel | ESign Service | SOAP/ HTTPS | Synchronous | The Digital Channel and Customer Connect can create eSign packages, add documents to a package (either existing documents stored in database, or newly generated documents directly uploaded to the eSignature Service), invite customers to sign, and start an e-sign session. |
| ESign Service | ESign Service | REST/ HTTPS | Synchronous | The ESign Service uses a signature API |
| ESign Service | Digital Library | SOAP/ HTTPS | Synchronous | The ESign Service uses the CMISAdapter retrieve documents (before uploading them for signing), and to store e-signed document/s. |
| signature process | e-Sign Event Listener | JSON/ HTTPS | Synchronous | Signing events are delivered to the eSignature Event Listener using HTTP POSTs sent to an HTTPS endpoint (the eSignature Event "Listener"). The URL can include a shared key. Each HTTP POST carries the shared key, allowing the Event Listener to validate the origin of the events. |
| eSignature Event Listener | ESignEvents Handler | JSON/ HTTPS | Synchronous | Events received by the eSignature Event Listener are passed to the Connector Grid's eSignature Event Handler via HTTP POST, which distributes the events to interested parties as needed. |
| ESignEvents Handler | ESign Service | REST/ HTTPS | Synchronous | When a 'package complete' event is received by the ESignEvents Handler, the handler notifies the ESign Service, which retrieves the signed document/s and stores them. |
| ESign Service | Digital Library | SOAP/ HTTPS | Asynchronous | After downloading signed document/s, the eSignature Event Handler stores the documents. |
| ESign Service | "Drop folder" | SFTP | Asynchronous | If signed documents are not stored, then ESign Service can deliver the signed documents to a "drop folder" (specified at the time the e-sign package was created). |
| ESignEvents Handler | "Callback" queue/topic | XML/ JMS | Asynchronous | Signing events received by the ESignEvents Handler posted to the "callback" queue or topic provided at the time that the e-sign package was created. |
| ESignEvents Handler | Document Tracking Service (DTS) | SOAP/ HTTPS | Synchronous | When signing events containing a DTS packageID and documentID are received, the Event Handler invokes updateDocumentStatus(SIGNED) on the Document Tracking Service. |
| Customer Connect | EICEmployee Service | SOAP/ HTTPS | Synchronous | Get employee information (i.e. job role, etc.). |

Figure 27:
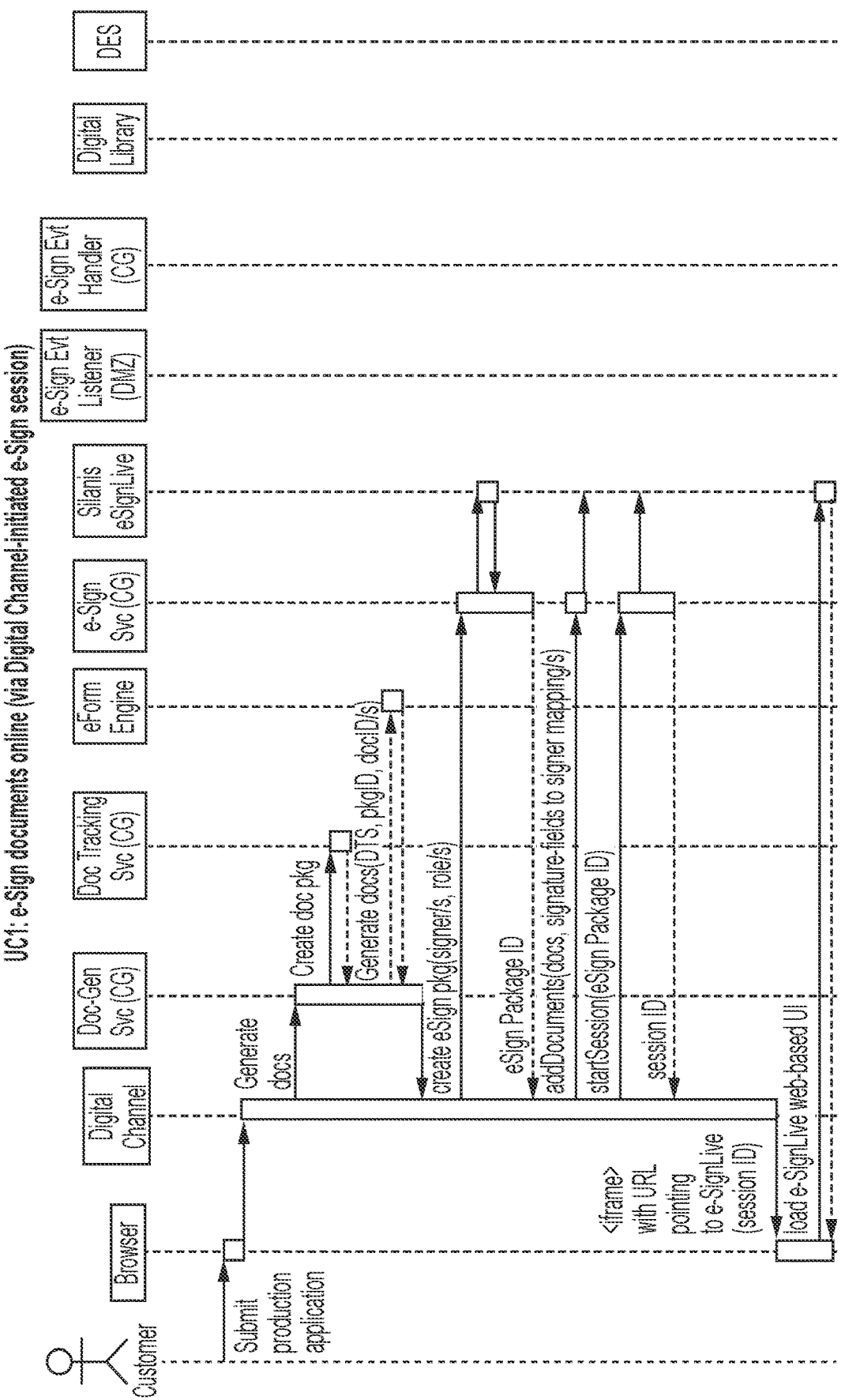
FIG. 27 illustrates a flow diagram of a digitization service platform according to some embodiments.

FIG. 27 is a schematic diagram of an example process for e-Signing documents online (via a Digital channel-initiated e-Sign session), according to some embodiments. As depicted, data can flow through a browser unit, digital channel unit, Doc-Gen service (CG) unit, doc tracking service (CG) unit, eForm engine, eSign service (CG), eSign event listener (DMZ), eSign event handler (CG), digital library unit, and DES unit.

In some embodiments, the following services are authenticated using SPNEGO (via DataPower): CMISContent, documentation, DocumentTrackingService, eSign, and printer.

In these embodiments, these services are exposed to channel applications as SOAP/HTTPS endpoints.

The following table describes features of an example digitization services platform, according to some embodiments.

| Quality Attribute | Definition | Specifications and solution |
|---|---|---|
| Availability | The ability of the system that represents a measure of its readiness for usage (e.g., Hours of operations) | Continuous: The system can be continuously available to users, Monday through Sunday, 365 days a year, excluding scheduled maintenance. Scheduled maintenance will be defined in the Operational Level Agreement. Application and infrastructure components are designed to allow for 'continuous' availability. Disaster recovery component should be available with recovery time object of 4 hours DR components are integrated into the application and infrastructure design |
| Reliability | The ability of the system to keep operating over time. Reliability is usually measured by mean time to failure (% downtime). | Minor outage - Up to 15 minutes Major outage - up to 1 hour Critical outage - >1 hour 'Continuous' availability is designed into the application and infrastructure design |
| Performance | The responsiveness of the system - that is, the time that may be used to respond to stimuli (events) or the number of events processed in some interval of time. Often expressed by the number of transactions per unit time, or by the amount of time that it takes to complete a transaction with the system (e.g., Transaction latency and volume, Peek performance characteristics). | Online Response time Capacity planning is based on the performance criteria. Performance testing is part of the development process. |
| Scalability | The ability to maintain or improve performance while system demand increases (e.g., transaction volume growth). | Time frame: 5 years. Organic growth expectation - 10% increase in customers and their transaction The application and infrastructure design allow scaling vertically and horizontally for the organic & planned growth |
| Security | A measure of the system's ability to resist unauthorized attempts at usage and denial of service, while still providing its services to legitimate users. Security is categorized in terms of the types of threats that might be made to the system. | SSL (HTTPS) between browser. SSL mutual-auth between BPM and CG, via DataPower. FileNet uses standard AD-based logins and SSL. |
| Maintainability | The aptitude of a system to undergo repair and evolution. (1) The ease with which a software system or component can be modified to correct faults, improve performance or other attributes, or adapt to a changed environment. (2) The ease with which a hardware system or component can be retained in, or restored to, a state in which it can perform functions. | All changes will be handled through the Production Change Process. Allow Operations to move an application from one server to another, independent of any other application, and without application code changes. Design to enable rolling upgrades/staged implementation. |

-continued

| Quality Attribute | Definition | Specifications and solution |
|---|---|---|
| Supportability | The ease with which a software system can be operationally maintained. | Application and infrastructure components supports EI standard monitoring tools. Will deploy EI standard monitoring tools; TIVOLI, BMC, Intrascope, etc.). |
| Reusability | The degree to which a software module or other work product can be used in more than one computing program or software system. This is typically in the form of reusing software that is an encapsulated unit of functionality. | Solution uses the HUB shared services (BPM and FileNet). |
| Extensibility | Description on how architecture accommodates future changes. | The HUB services are architected to support enterprise extensibility |

The following table describes mapping between application components and various components of a digitization services platform, according to some embodiments.

| Application/Solution Components/Services | Platform |
|---|---|
| Gateway | Data Power |
| Documentation Service | CG |
| Document Tracking Service | CG |
| Document Event Service | CG |
| Smart DSS | EBS - Java on WAS (Liberty Base |
| Employee Notification | CG (EMS Topic) |
| Documents Operational Reports | IDP and Spotfire |
| Printer Service | CG |
| CMISContent | CG |
| EICEmployee | CG |
| BPM | Hub BPM |

In some embodiments of digitization services platform, the following process digitization core areas can have a variety of technology standards and example states and alignment: scanning, document management, workflow, e-Signature, search, specialized workflows.

For example, various technology standards are provided for process digitization services, according to some embodiments.

| Category | Description |
|---|---|
| Process Documentation | Document and analyze business processes; make process documentation available to employees. |
| Fax | Send and receive electronic faxes |
| Capture & Scanning | Convert paper to electronic format (Scan, Fax), including extraction of metadata and other info from scanned documents or images (such as TIFF files from received faxes) using OCR, bar-code reading, etc. and ingest captured documents into Content Management system. |
| Archive/Document Management | Provide storage, search and retrieval for electronic documents-typically those associated with customer-related activities (e.g. loan applications, proof of employment, income verification)-as well as manage document lifecycle (e.g. records management) |
| Workflow | Automate business processes and provide insight into process performance, cycle-times, etc. allowing for continual process improvement/refinement. |
| e-Signature | Allow customers and employees to electronically affix a signature or its equivalent to an electronic document, both online ("unmediated signing"[1]) and person ("mediated"[1], in-branch, for example). |
| Search | Search for (electronic) documents based on user-entered search criteria. Currently search is limited to documents stored in FileNet, but future capabilities July extend search across Sharepoint, LiveLink, etc. |
| Collaboration | Enable internal (employee-to-employee) and external (employee-to-customer) collaboration and document sharing. |
| Specialized Workflows | |

There may be provided mediated or unmediated e-signing.

In some embodiments, various specialized workflows are provided or technology standards used for process digitization services.

"Specialized workflows" refers to use-cases where workflow functionality is used, and such "workflow" functionality might already exist within an off-the-shelf product being considered, or a strong case can be made to use an alternative to the organization's workflow standard (e.g., BPM).

In general, for new "specialized workflows" BPM should be considered for use. Where workflows need to span both front-office (branch) and product operations, BPM provides strong support.

Each new "specialized workflow" should be considered on a case-by-case basis using the standard Hub Intake process.

Migration of existing "specialized workflows" to BPM should be considered as/when business process improvement is desired.

FIG. 28 is a schematic diagram of example capabilities and vendors for process digitization services, according to some embodiments.

The following table summarizes example capabilities for process digitization services, according to some embodiments.

| Capability |
| --- |
| Process Documentation |
| Fax |
| Scan & Capture |
| Archive/Document Management |
| Record Management |
| (associated with Archive/Doc Mgmt) |
| "Workflow" |
| eSignature |
| Search |
| Collaboration |

The following table describes various standards used for the below-listed use cases, according to some embodiments.

| Use-case |
| --- |
| P&C Product Operations "Workflow" |
| Customer Onboarding |
| P&C Mortgage Workflow |
| US AML High-Risk Unit (HRU) Workflow |
| P&C Commercial Lending Workflow |
| ("specialized workflow") |

The diagram shows the established integration between key components of the Hub's Digitization Foundation, for example RightFax, Captiva, Digital Library, and BPM. For example, for RightFax, faxes received by RightFax are routed for image quality improvement and indexing. For faxes, scanned documents that are processed (image quality checks, enhancement, indexing) are, among other paths, routed into the Digital Library for storage and subsequent retrieval. For the Digital Library, the Digital Library has been integrated (via Connector Grid) with: branch-scanning solutions (allowing scanned documents to be directly uploaded and stored); BPM, sending notifications to workflows when documents are stored/updated, allowing workflows to automatically move on to the next step in the workflow (typically a "Review documents step"); and end-user applications, allowing employees to search for documents stored in the Digital Library, update document metadata, etc. directly from familiar applications (such as Customer Connect, BPM workspace, etc.).

For BPM, for Branch Scanning services, BPM is integrated with the branch scanning solution, allowing workflows to request documents to be scanned, and employees to use in-branch MFDs to scan documents directly into the workflow. BPM is tightly integrated with Spotfire, allowing process cycle times, etc. to be visualized, and enabling continual process improvement.

The diagram shows an example state of the organization's Process Digitization technology stack. Key points are the addition of e-Signature services (both in-branch and online); ability for customers to upload documents from online channels (shown as "OLB" in the diagram); and ability to launch workflows in BPM from channels (e.g. mobile, tablet).

The diagram shows a view of the target state of the organization's Process Digitization technology stack. Key points are an ability for customers to upload documents from online channels (shown as "OLB" in the diagram); an ability to launch workflows in BPM from channels (e.g. mobile, tablet); ability for customers to see workflow status within channel applications; and automated workflow spanning front-office and product operations.

The diagram depicts a variety of services indicated by the following abbreviations: WIS (Workflow Initiation Service); WSS (Workflow Status Service); DS (Document Service); DES (Document Event Service); DSS (Document Set Service); DTS (Document Tracking Service); and CMIS (Content Management Interoperability Services).

In cases where business processes are automated by means of BPM-driven workflows, a "structured" approach can be taken to getting the required documents into the Digital Library, as depicted. For example, a customer completing an online application from a tablet, PC, etc. (a) for some product might, behind the scenes, give rise to new workflow in BPM (b). When documents are required, the workflow in BPM can submit a request for documents to be scanned (by an employee) or uploaded (by a customer), or possibly both. Employees can then scan documents (either internally generated or brought in by a customer) at a Multi-Function Printer (MFP) (c), and/or customers can upload documents from online channels. Either way, the documents are stored in the Digital Library (d). This process is referred to as "structured" document acquisition.

In cases where business processes are fluid, or not automated by BPM-driven workflows, an "informal" or ad hoc approach can be taken to sharing documents with, or obtaining documents from customers. This provides a second implementation of collaboration services ("Informal"/Ad Hoc Document Acquisition/Sharing).

For example, when sharing files with customers, using OneDrive, employees can share files with customers, and customers can then access those files via the Internet (by logging into OneDrive). When receiving files from customers, employees can share folders with customers, granting individual customers "write" access, allowing the customer to upload files into the shared folder in the employee's OneDrive account. Uploaded files are automatically "synced" to the employees work device(s) and can be accessed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity only one computing device 2100 is shown in FIG. 2, but the respective systems may include more computing devices operable by users to access remote network resources and exchange data. The computing devices may be the same or different types of devices. The computing device includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system comprising a processor and a non-transient data memory storage, the non-transient data memory storage containing machine-readable instructions for execution by the processor, the machine-readable instructions configured to, when executed by the processor:

load and store data from a plurality of source systems at a data hub of an enterprise implemented by a non-transient data store;

generate a process computer model comprising instructions for digitization of documents, the instructions indicating required document types, and branches of the enterprise with scanning systems included in the process computer model, wherein the processor integrates with the scanning systems included in the process computer model to capture scanner data for the digitization of documents;

in response to receiving a request to generate a document package at the data hub, the request indicating a target unit to transmit the document package, the request linked to the process computer model:

scan, using the integrated scanning systems, documents corresponding to the required document types indicated in the instructions of the computer model;

extract information from the scanned documents using optical character recognition (OCR);

generate and store, at the data hub, the document package using a subset of data from the data at the data hub including the required document types, the scanned documents, and the extracted information, the document package stored at the data hub for subsequent search and retrieval to reduce data sprawl, wherein the process computer model is linked to a retail branch of the enterprise that indicates the required document types for the document package;

transmit the document package to the target unit indicated by the request; and receive and store a modified version of the document package containing at least one electronic signature in response to at least one electronic signature request, wherein the processor is configured to detect an electronic signature event at the data hub and capture data from the electronic signature event for storage as part of the document package.

2. The system of claim 1, wherein the document package is associated with a document package identifier, wherein the machine-readable instructions are configured to monitor the document package at the data hub, detect a document change notification, and store the change notification in association with the document package identifier as part of an audit log.

3. The system of claim 1, wherein the machine-readable instructions are configured to assign the document package to a user identifier having an access role, wherein prior to transmission, the machine-readable instructions are configured to check the access role and the target unit.

4. The system of claim 1, further comprising an electronic signature event listener to process the electronic signature event in real-time.

5. The system of claim 4, further comprising an electronic signature event handler to receive the electronic signature event in real-time from the electronic signature event listener.

6. The system of claim 1, wherein the process computer model indicates a number of required documents for the document package.

7. A non-transitory machine-readable medium storing instructions configured to, when executed by a processor:

generate a process computer model comprising instructions for digitization of documents, the instructions indicating required document types, and branches of the enterprise with scanning systems included in the process computer model, wherein the processor integrates with the scanning systems included in the process computer model to capture scanner data for the digitization of documents;

in response to receiving a request to generate a document package at a data hub, the request indicating a target unit to transmit the document package, the request linked to the process computer model;

scan, using the integrated scanning systems, documents corresponding to the required document types indicated in the instructions of the computer model;

extract information from the scanned documents using optical character recognition (OCR);

generate and store, at the data hub, the document package using a subset of data from the data at the data hub including the required document types, the scanned documents, and the extracted information, the document package stored at the data hub for subsequent search and retrieval to reduce data sprawl, wherein the process computer model is linked to a retail branch of the enterprise that indicates the required document types for the document package;

transmit the document package to the target unit indicated by the request; and receive and store a modified version of the document package containing at least one electronic signature in response to at least one electronic signature request, wherein the processor can detect an electronic signature event at the data hub and capture data from the electronic signature event for storage as part of the document package.

8. The non-transitory machine-readable medium of claim 7, wherein the document package is associated with a document package identifier, wherein the instructions are configured to monitor the document package at the data hub, detect a document change notification, and store the change notification in association with the document package identifier as part of an audit log.

9. The non-transitory machine-readable medium of claim 7, wherein the instructions are configured to assign the document package to a user identifier having an access role, wherein prior to transmission, the instructions are configured to check the access role and the target unit.

10. The non-transitory machine-readable medium of claim 7, wherein the instructions are configured to execute an electronic signature event listener to process the electronic signature event in real-time.

11. The non-transitory machine-readable medium of claim 10, wherein the instructions are configured to execute an electronic signature event handler to receive the electronic signature event in real-time from the electronic signature event listener.

12. The non-transitory machine-readable medium of claim 7, wherein the process computer model indicates a number of required documents for the document package.

* * * * *